United States Patent
Suzuki et al.

(10) Patent No.: US 10,942,050 B2
(45) Date of Patent: Mar. 9, 2021

(54) THERMAL FLOWMETER

(71) Applicant: Hitachi Automotive Systems, Ltd., Hitachinaka (JP)

(72) Inventors: Kazunori Suzuki, Hitachinaka (JP); Akira Uenodan, Hitachinaka (JP); Junichi Horie, Hitachinaka (JP)

(73) Assignee: Hitachi Automotive Systems, Ltd., Hitachinaka (JP)

( * ) Notice: Subject to any disclaimer, the term of this patent is extended or adjusted under 35 U.S.C. 154(b) by 240 days.

(21) Appl. No.: 16/092,644

(22) PCT Filed: Jun. 5, 2017

(86) PCT No.: PCT/JP2017/020791
§ 371 (c)(1),
(2) Date: Oct. 10, 2018

(87) PCT Pub. No.: WO2017/221680
PCT Pub. Date: Dec. 28, 2017

(65) Prior Publication Data
US 2019/0128716 A1 May 2, 2019

(30) Foreign Application Priority Data
Jun. 24, 2016 (JP) .............................. JP2016-125797

(51) Int. Cl.
*G01F 1/684* (2006.01)
*G01M 15/04* (2006.01)

(52) U.S. Cl.
CPC ............ *G01F 1/684* (2013.01); *G01M 15/042* (2013.01)

(58) Field of Classification Search
CPC .............................. G01F 1/684; G01M 15/042
(Continued)

(56) References Cited

U.S. PATENT DOCUMENTS 6,851,311 B2 * 2/2005 Nakada ................. F02D 41/187
73/202.5
2001/0049970 A1 12/2001 Kitahara et al.
(Continued)

FOREIGN PATENT DOCUMENTS

JP 2002-54962 A 2/2002
JP 2009-122054 A 6/2009
(Continued)

OTHER PUBLICATIONS

International Search Report (PCT/ISA/210) issued in PCT Application No. PCT/JP2017/020791 dated Sep. 26, 2017 with English translation (eight (8) pages).
(Continued)

*Primary Examiner* — Octavia Hollington
(74) *Attorney, Agent, or Firm* — Crowell & Moring LLP

(57) ABSTRACT

The present invention is directed to a thermal flowmeter that prevents erroneous detection of backflow by suppressing circulation of air flow from a flow detection unit side to a back side or from the back side to the flow detection unit side and measures a gas flow rate with high accuracy. A thermal flowmeter of the present invention includes a bypass passage through which a gas to be measured passes; a dividing portion which divides the inside of the bypass passage into a first passage portion and a second passage portion; and a flow detection unit which is provided on a surface of the dividing portion on the first passage portion side and detects a flow rate of the gas to be measured. Further, the first passage portion has a detection surface on which the flow detection unit is exposed, an opposing surface which opposes the flow detection unit on the detection surface, and non-opposing surfaces and which are disposed at positions deviating from the opposing surface in a bypass passage width direction of the first passage portion and do not oppose the flow detection unit, and the non-opposing surface is (Continued)

separated from the detection surface farther than the opposing surface.

11 Claims, 25 Drawing Sheets

(58) Field of Classification Search
USPC .................................................. 73/114.34
See application file for complete search history.

(56) References Cited

U.S. PATENT DOCUMENTS

| | | |
|---|---|---|
| 2009/0126477 A1 | 5/2009 | Saito et al. |
| 2014/0174166 A1 | 6/2014 | Mais et al. |
| 2015/0135824 A1* | 5/2015 | Morino .................. G01F 1/692 |
| | | 73/204.13 |
| 2015/0168193 A1 | 6/2015 | Morino et al. |
| 2017/0336232 A1* | 11/2017 | Tashiro .................. G01F 1/684 |

FOREIGN PATENT DOCUMENTS

| | | |
|---|---|---|
| JP | 2012-93173 A | 5/2012 |
| JP | 2014-102219 A | 6/2014 |
| WO | WO 2013/187251 A1 | 12/2013 |
| WO | WO 2015/045435 A1 | 4/2015 |

OTHER PUBLICATIONS

Japanese-language Written Opinion (PCT/ISA/237) issued in PCT Application No. PCT/JP2017/020791 dated Sep. 26, 2017 with English translation (seven (7) pages).

* cited by examiner

B-B'

THERMAL FLOWMETER

TECHNICAL FIELD

The present invention relates to a thermal flowmeter.

BACKGROUND ART

In automotive engines, it is necessary to measure a flow rate of intake air in order to control a fuel injection amount. One type of devices that measure the intake air flow rate is a thermal flowmeter using a heating resistor. The thermal flowmeter is configured to measure the intake air flow rate by performing heat transfer between a flow detection unit formed in a flow detection element and the intake air flow rate to be measured.

This thermal flowmeter is attached to an intake pipe configured to take air into an engine. The inside of the intake pipe is formed as an environment in which substances other than air such as engine oil, an unburned gas, and an EGR gas reach or pulsation occurs due to disturbance in the air flow.

Under such an environment, the thermal flowmeter is provided with a bypass passage in order to measure the intake air flow rate with high accuracy, and the flow detection unit is disposed in the bypass passage.

PTL 1 discloses a technique of splitting flow to a flow detection element side and an opposite side thereof within a bypass passage to reduce arrival of contaminants such as dust to a flow detection unit.

PTL 2 discloses a technique of setting a loss of a sub air passage on a side where a flow detection element is not provided to be larger than a loss in a sub air passage on a side of the flow detection element to reduce influence of air pulsation.

CITATION LIST

Patent Literature

PTL 1: JP 2009-122054 A
PTL 2: JP 2002-54962 A

SUMMARY OF INVENTION

Technical Problem

In recent years, low idling has been achieved along with downsizing of engine displacement in order to improve fuel economy. In the low idling, a flow rate of intake air becomes lower, and thus, it is necessary to improve detection accuracy of the low flow rate. Furthermore, in order to prevent oil deterioration inside a crankcase, studies have been conducted regarding a structure in which the inside of an intake pipe and the inside of the crankcase between an intake air flow detection device and a throttle valve are connected by a blow-by gas pipe.

Pressure fluctuations occur inside the crankcase due to piston movement of the engine, and such pressure fluctuations reach a thermal flow measurement device after passing through the inside of the blow-by gas pipe. In particular, a flow rate of new intake air decreases under a low idle (low flow rate) condition, and thus, the influence of pressure from the blow-by gas pipe becomes relatively great. As a result, air pulsation sometimes occurs even under the low flow rate condition where pulsation hardly occurs originally. Thus, it is necessary to detect the intake air flow rate with high accuracy even in the air pulsation under the low flow rate condition.

In the structure in which the bypass passage is split between the flow detection unit side and the back side where the flow detection unit is not provided, if there is a difference in each flow path resistance, a difference in flow velocity occurs due to the difference in the flow path resistance. In particular, the flow detection unit side has a throttle shape in order to rectify the flow, and thus, the difference occurs in the flow path resistance between the flow detection unit side and the back side.

Under pulsation, a pressure difference occurs due to influence of a flow velocity difference and becomes a pressure difference of negative pressure when the flow velocity is high or becomes a pressure difference close to atmospheric pressure when the flow velocity is low. For example, when the flow rate resistance on the flow detection unit side is significantly larger than the flow rate resistance on the back side, air on the back side is pulled toward the flow detection element side due to the pressure difference so that circulation of air flow in which air flows from the back side to the flow detection element side occurs. It has been found a new problem that such circulation causes the thermal flowmeter to detect backflow although backflow of flow of intake air does not occur in an intake duct.

An object of the present invention is to provide a thermal flowmeter that suppresses circulation of air flow from a flow detection unit side to a back side or from the back side to the flow detection unit side and measures a gas flow rate with high accuracy without erroneously detecting backflow.

Solution to Problem

In order to solve the above-described problem, the present invention has the structure as described herein.

Advantageous Effects of Invention

According to the present invention, it is possible to suppress the circulation of air flow between the flow detection unit side and the back side, to prevent the erroneous detection of backflow, and to measure an intake air flow rate with high accuracy under a low flow pulsation condition.

DESCRIPTION OF EMBODIMENTS

Hereinafter, embodiments of a thermal flowmeter of the present invention will be described with reference to the drawings.

First Embodiment

A first embodiment will be described with reference to FIGS. 1 to 10.

Figure 1:
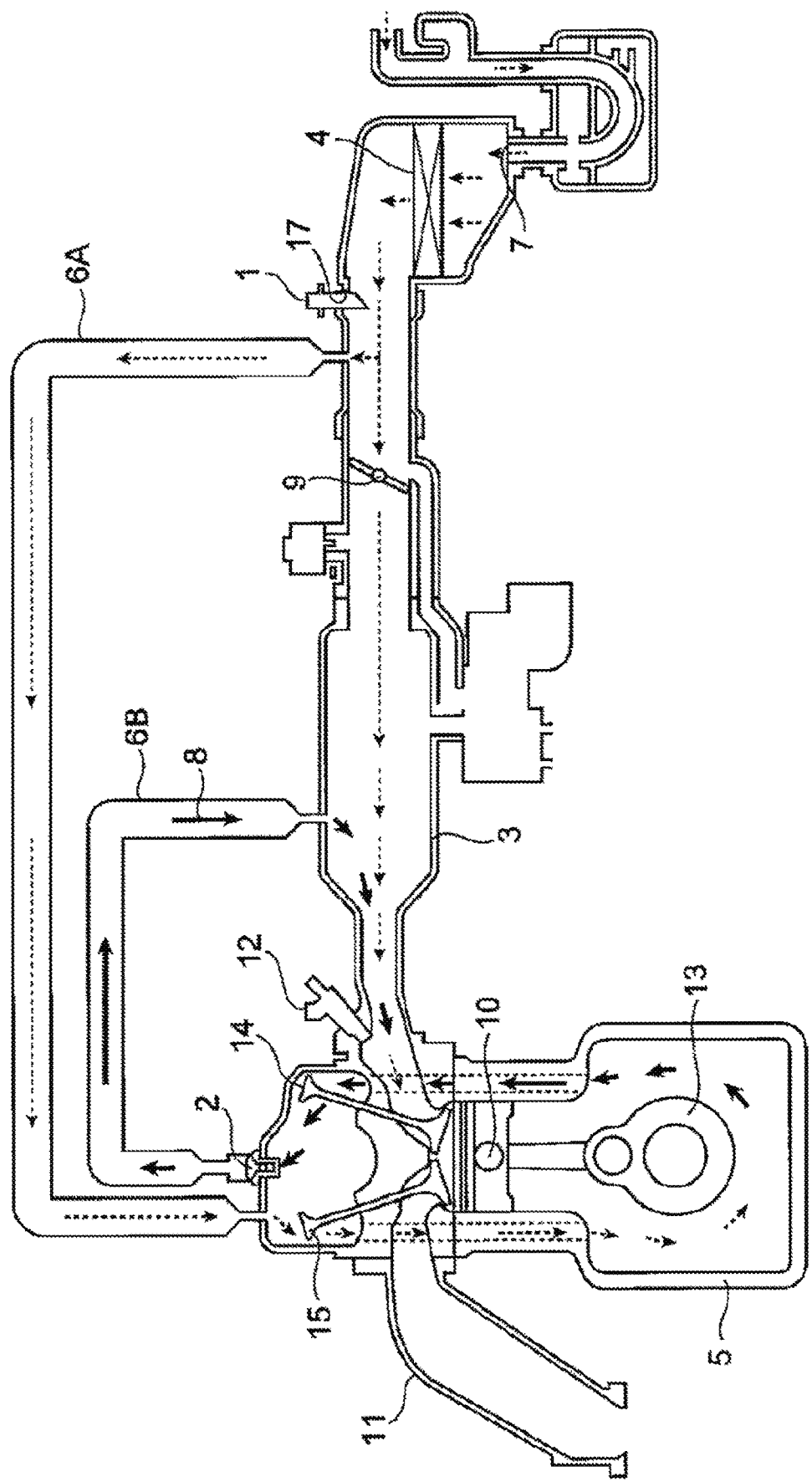
FIG. 1 is a view illustrating flow of a blow-by gas during a normal operation.
Figure 2:
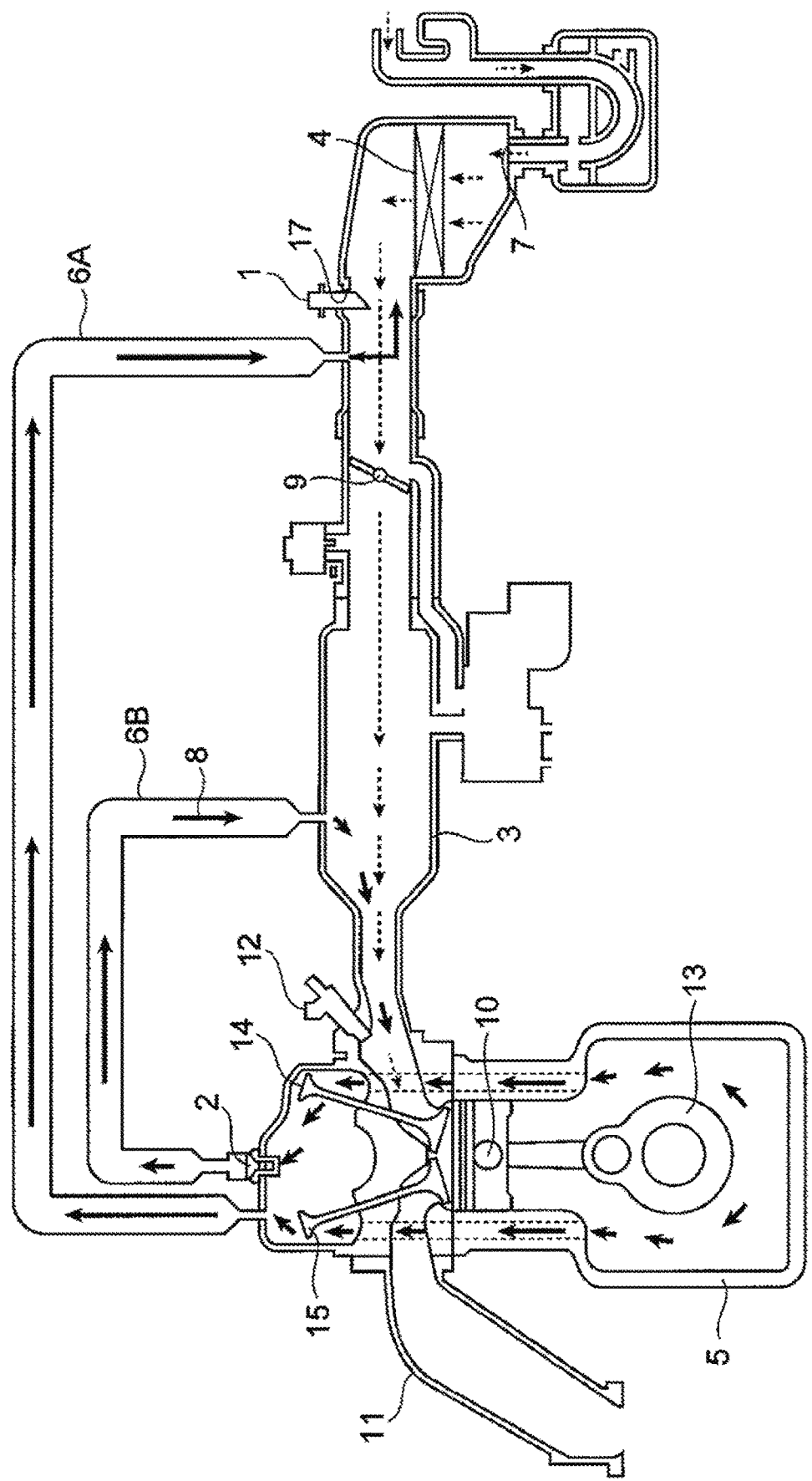
FIG. 2 is a view illustrating flow of a blow-by gas during a low idle operation.

FIGS. 1 and 2 are views illustrating a configuration of an engine system of an automobile. FIG. 1 is a view for describing flow of a blow-by gas during a normal operation, and FIG. 2 is a view for describing flow of a blow-by gas during a low idle operation. Incidentally, in the following description, an engine operation state where an engine is operated to idle at a lower engine rotation speed than that in the related art will be referred to as the low idle operation, and an engine operation state other than the low idle operation will be referred to as the normal operation.

The engine system includes an engine body, and an intake passage and exhaust passage which are connected to the engine body. In order from the upstream side, an air cleaner 4, a throttle valve 9, and an intake manifold 3 are provided in the intake passage, and an exhaust manifold 11 is provided in the exhaust passage. The thermal flowmeter 1 is disposed between the air cleaner 4 and the throttle valve 9 and detects a flow rate of new intake air 7 to be sucked into the engine body.

Figure 3:
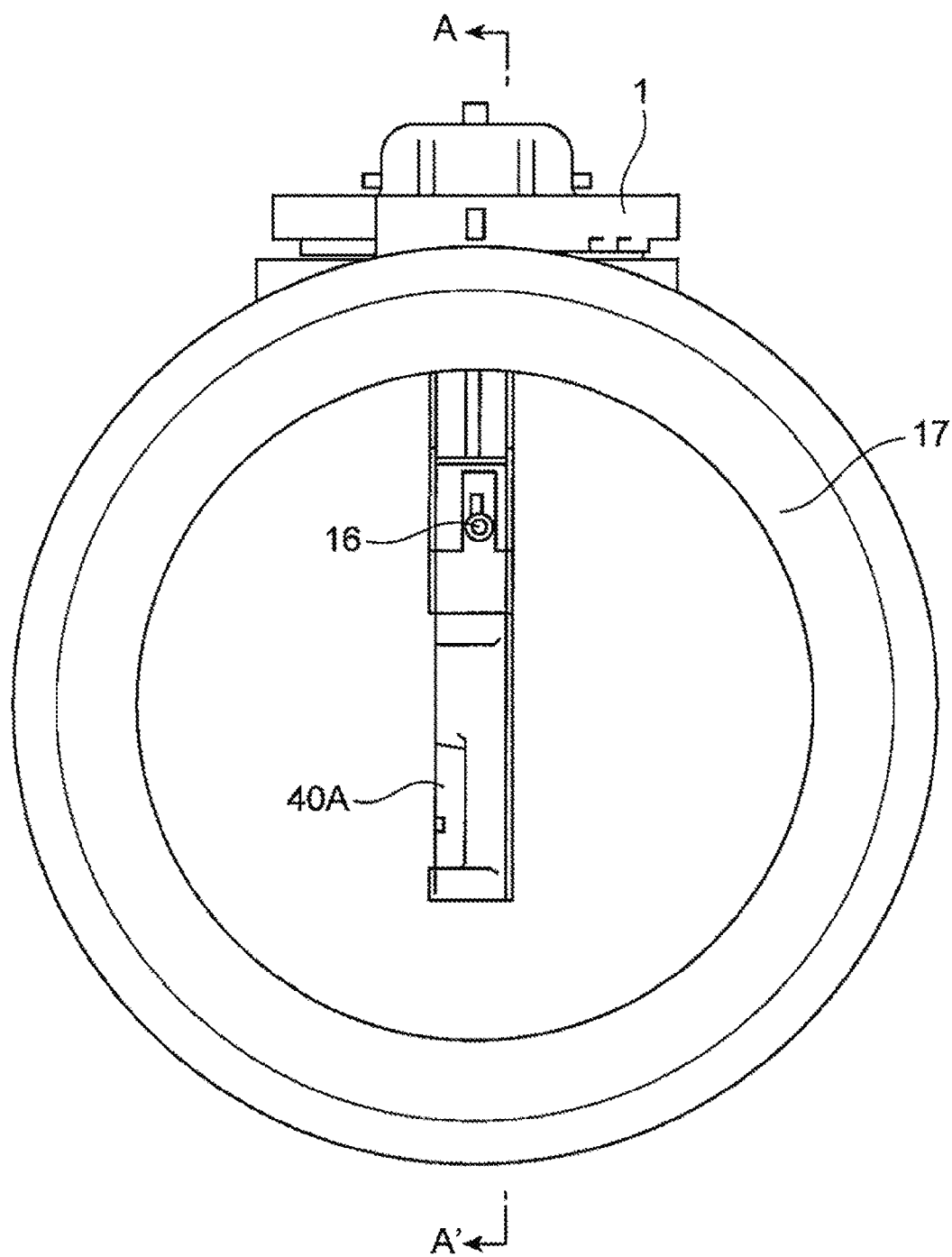
FIG. 3 is an installation view of a thermal flowmeter on an intake body.
Figure 4:
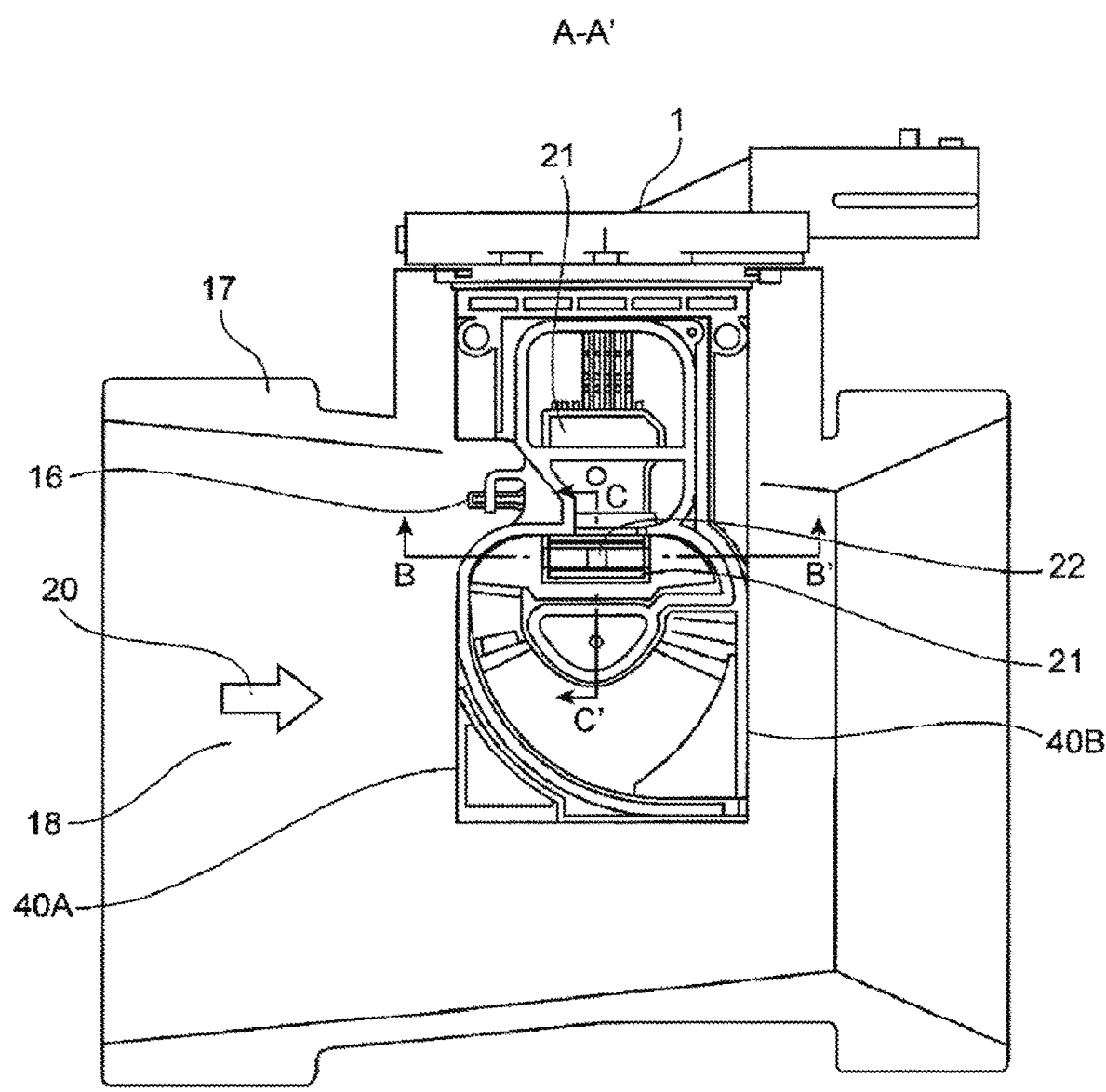
FIG. 4 is a cross-sectional view taken along a line A-A' of FIG. 3.

FIG. 3 is an installation view of the thermal flowmeter on an intake body, and FIG. 4 is a cross-sectional view taken along a line A-A' of FIG. 3. The thermal flowmeter 1 is attached to an intake body 17 disposed between the air cleaner 4 and the throttle valve 9. The thermal flowmeter 1 is inserted from an opening of the intake body 17 such that a proximal end is fixed to the intake body 17, and a distal end is disposed at a position protruding from the center of the intake body 17. The thermal flowmeter 1 has a flat plate shape having a predetermined thickness and is disposed and fixed such that a flat surface portion is parallel to a central axis line of the intake body 17.

In the engine system having the above-described configuration, the new intake air 7 is taken into the intake passage via the air cleaner 4, passes through the throttle valve 9, passes through the intake manifold 3, and is taken into a combustion chamber from an intake valve 14 as illustrated in FIG. 1. The engine system is provided with blow-by gas pipes 6A and 6B configured to circulate new intake air inside a crankcase 5 in order to prevent deterioration of lubricating oil inside the crankcase 5.

The blow-by gas pipe 6A has one end connected to communicate with the intake passage between the thermal flowmeter 1 and the throttle valve 9, and the other end connected to communicate with the inside of the crankcase 5 of the engine body. Further, the blow-by gas pipe 6B has one end connected to communicate with the intake manifold 3 between an injector 12 and the throttle valve 9, and the other end connected to communicate with the inside of the crankcase 5 of the engine body via PCV 2 (positive crankcase ventilation).

During the normal operation, a part of the new intake air 7 inside the intake passage is taken into the crankcase 5 through the blow-by gas pipe 6A, and the blow-by gas inside the crankcase 5 is returned to the intake manifold 3 through the blow-by gas pipe 6B. As a result, the air inside the crankcase 5 is circulated by the new intake air.

On the other hand, during the low idle operation, the flow rate of the new intake air 7 decreases since the engine speed is low as illustrated in FIG. 2. However, the pressure fluctuations inside the crankcase 5 caused by reciprocating movement of the piston 10 still occur without being changed from the case of the normal operation.

Therefore, during the low idle operation, the blow-by gas 8 inside the crankcase 5 passes through the blow-by gas pipe 6A and returns to the intake passage from the portion between the thermal flowmeter 1 and the throttle valve 9. Furthermore, the blow-by gas 8 reaches the thermal flowmeter 1 since the throttle valve 9 is closed in the low idle operation. Under this condition, the pulsation of air occurs even at the low flow rate.

Figure 5:
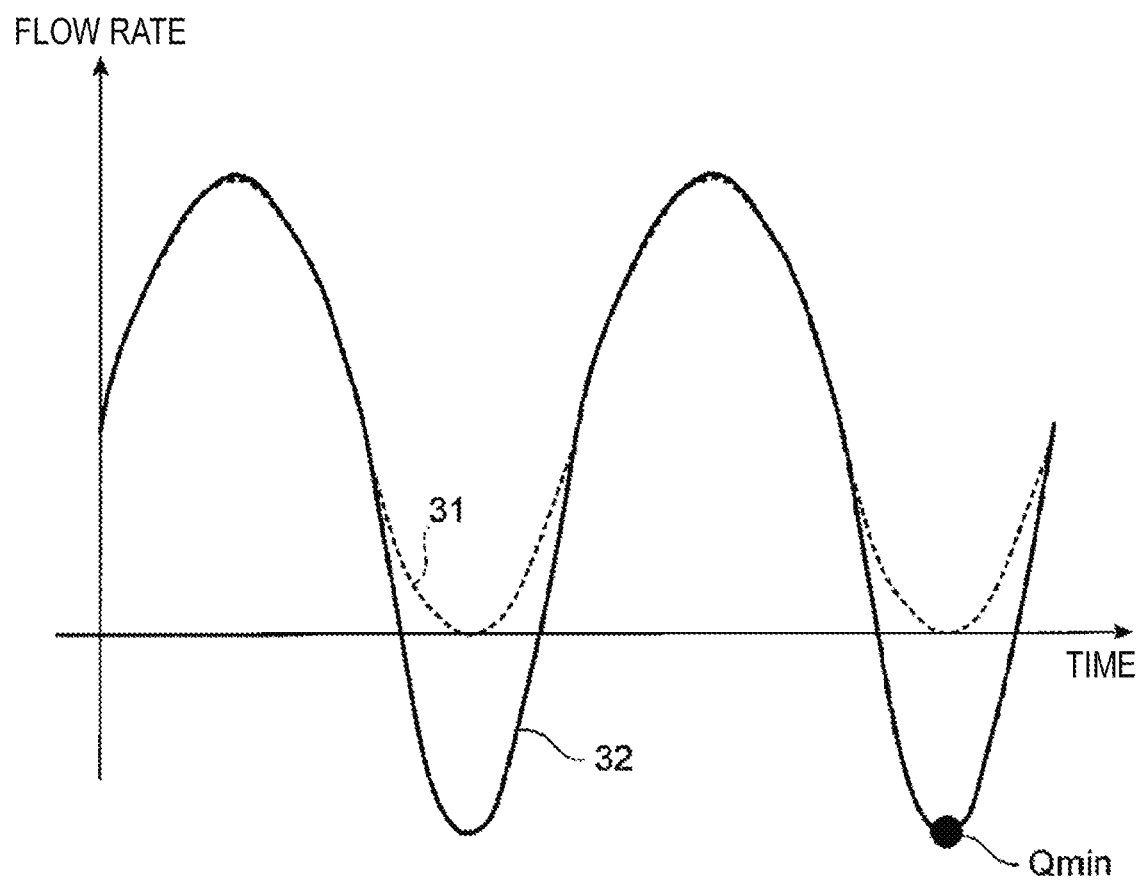
FIG. 5 is a graph illustrating flow rate characteristics in an intake passage during the low idle operation.

FIG. 5 is a graph illustrating flow rate characteristics inside the intake passage during the low idle operation, and is the graph in which a solid line 32 indicates a flow rate of intake air detected by a conventional thermal flowmeter and a dotted line 31 indicates an actual flow rate of intake air. As illustrated in FIG. 5, no backflow actually occurs, but a minimum intake air flow rate Qmin is negative so that the backflow is erroneously detected in the conventional thermal flowmeter.

Figure 6:
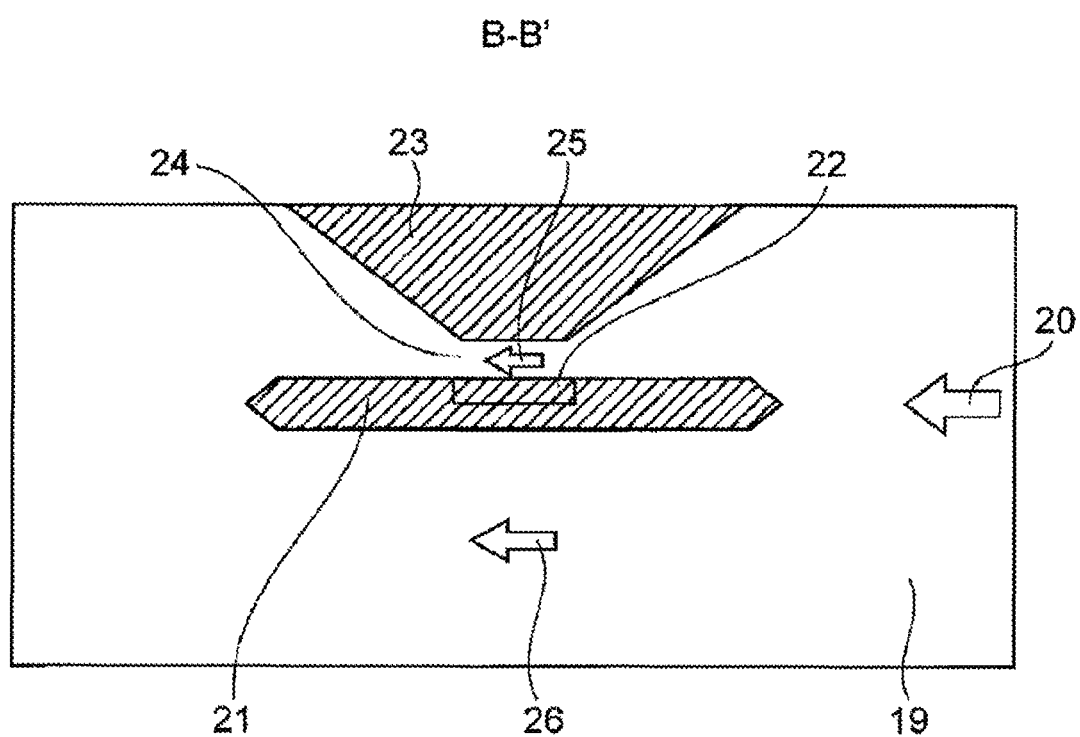
FIG. 6 is a cross-sectional view taken along a line B-B' of FIG. 4 illustrating flow of air in a bypass passage during the normal operation.
Figure 7:
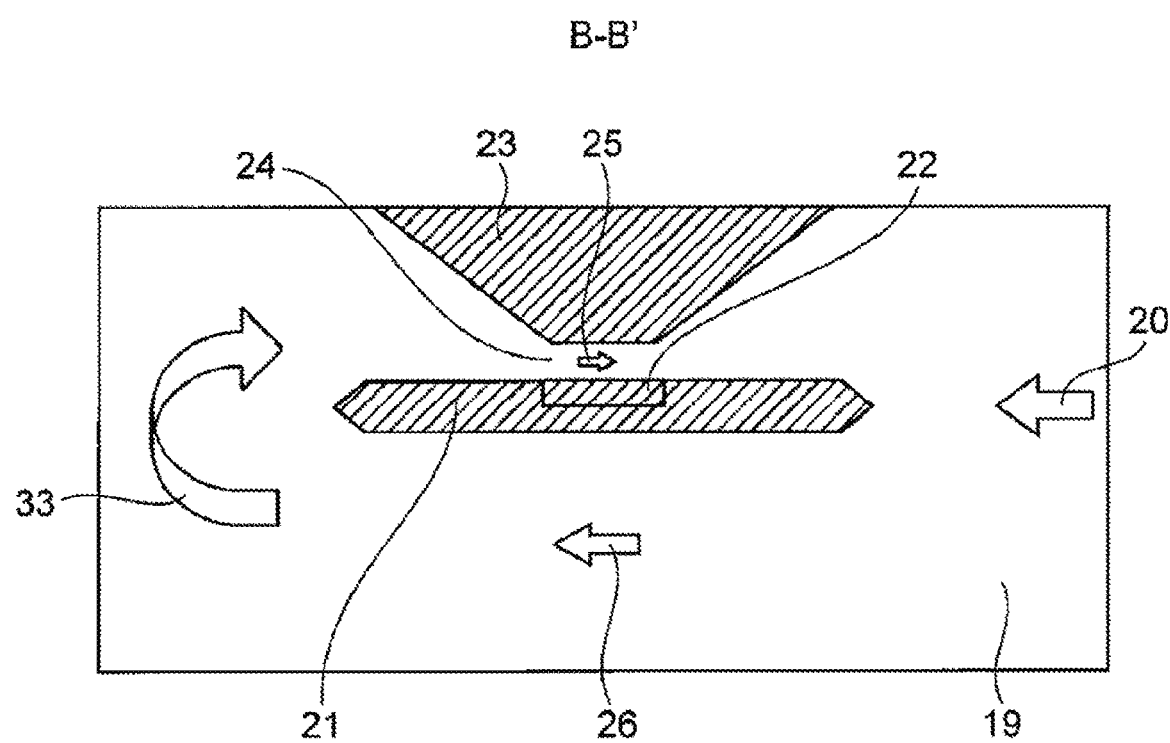
FIG. 7 is a cross-sectional view taken along the line B-B' of FIG. 4 illustrating flow of air in the bypass passage during the low idle operation.

FIG. 6 is a cross-sectional view taken along a line B-B' of FIG. 4 illustrating flow of air in the bypass passage during the normal operation, and FIG. 7 is a cross-sectional view taken along the line B-B' of FIG. 4 illustrating flow of air in the bypass passage during the low idle operation.

The thermal flowmeter 1 has a bypass passage 19 that takes a part of intake air flowing inside the intake body 17. The bypass passage 19 has a loop shape in which a bypass passage inlet 40A opens toward the air cleaner 4 side of the intake body 17 and a bypass passage outlet 40B opens toward the engine body side of the intake body 17 such that the intake air that has flown into the bypass passage 19 from the bypass passage inlet 40A is made to circulate once and then flow out from the bypass passage outlet 40B.

Further, a chip package 21 is disposed in the bypass passage 19 as illustrated in FIG. 6. The chip package 21 has a flat plate shape, and a flow detection unit 22, configured to detect the flow rate of intake air, is provided on a detection surface which is a package front surface of the chip package 21 so as to be exposed. The chip package 21 is disposed along the flow of intake air flowing in the bypass passage 19, and divides the bypass passage 19 into a first passage portion on a package front side and a second passage portion on a package back side (dividing portion).

As the bypass passage 19 is divided into the first passage portion on the package front side and the second passage portion on the package back side by the chip package 21 in this manner, air containing foreign substances such as water and contaminants is caused to flow on the package back side so that these foreign substances are prevented from adhering to the flow detection unit 22.

In the bypass passage 19, a protrusion 23 that contracts air flow is provided in the first passage portion on the package front side. The protrusion 23 protrudes toward the flow detection unit 22. As a result, a throttle 24 that throttles the flow of air is formed on the package front side of the bypass passage 19, and it is possible to prevent formation of a boundary layer of intake air with respect to the flow detection unit 22.

On the other hand, since the protrusion 23 is provided, air flow 25 on the package front side becomes slower than air flow 26 on the package back side so that a difference in air flow speed occurs.

Figure 8:
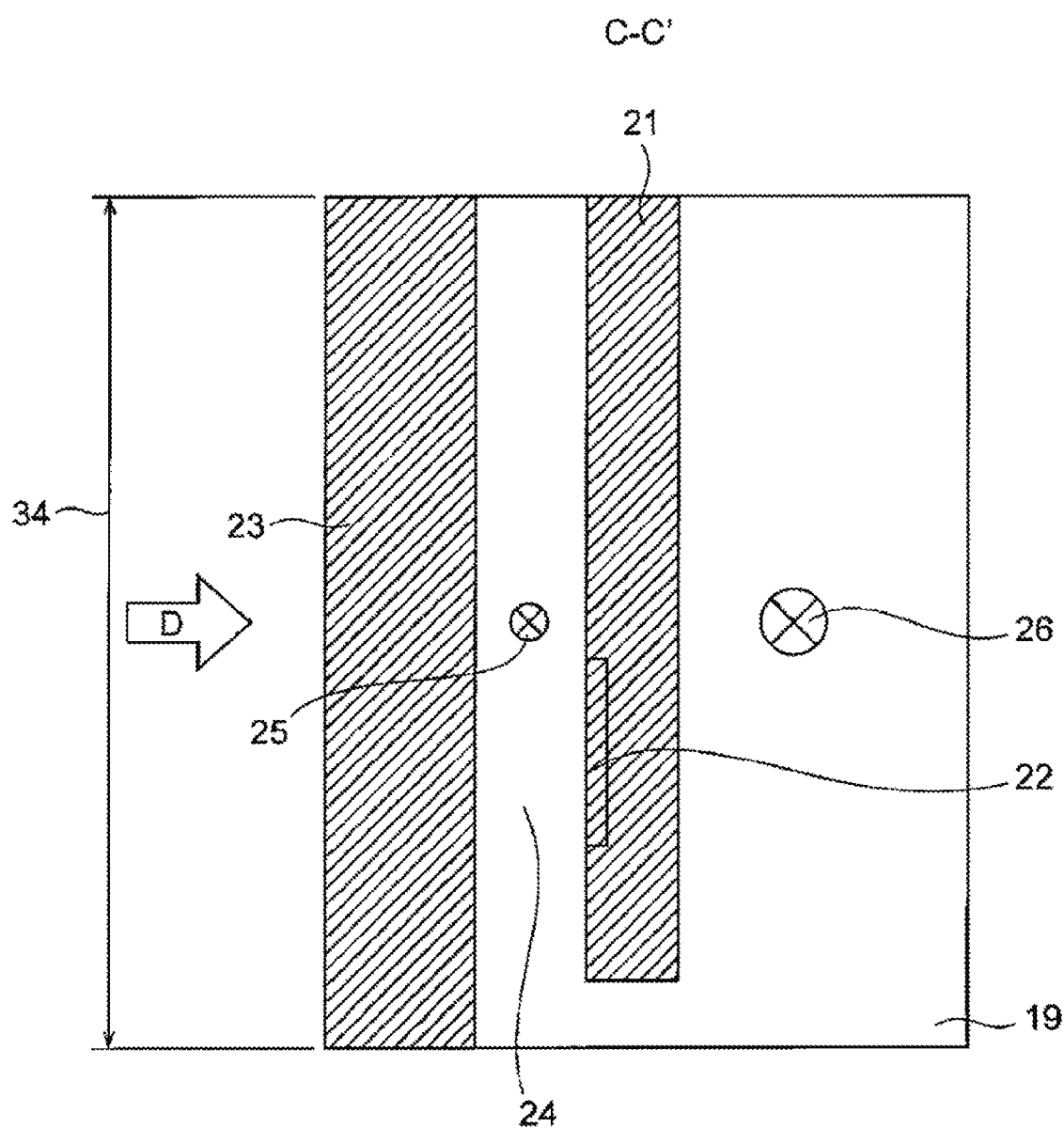
FIG. 8 is a cross-sectional view taken along a line C-C' of FIG. 4 illustrating a structure of the related art.
Figure 11:
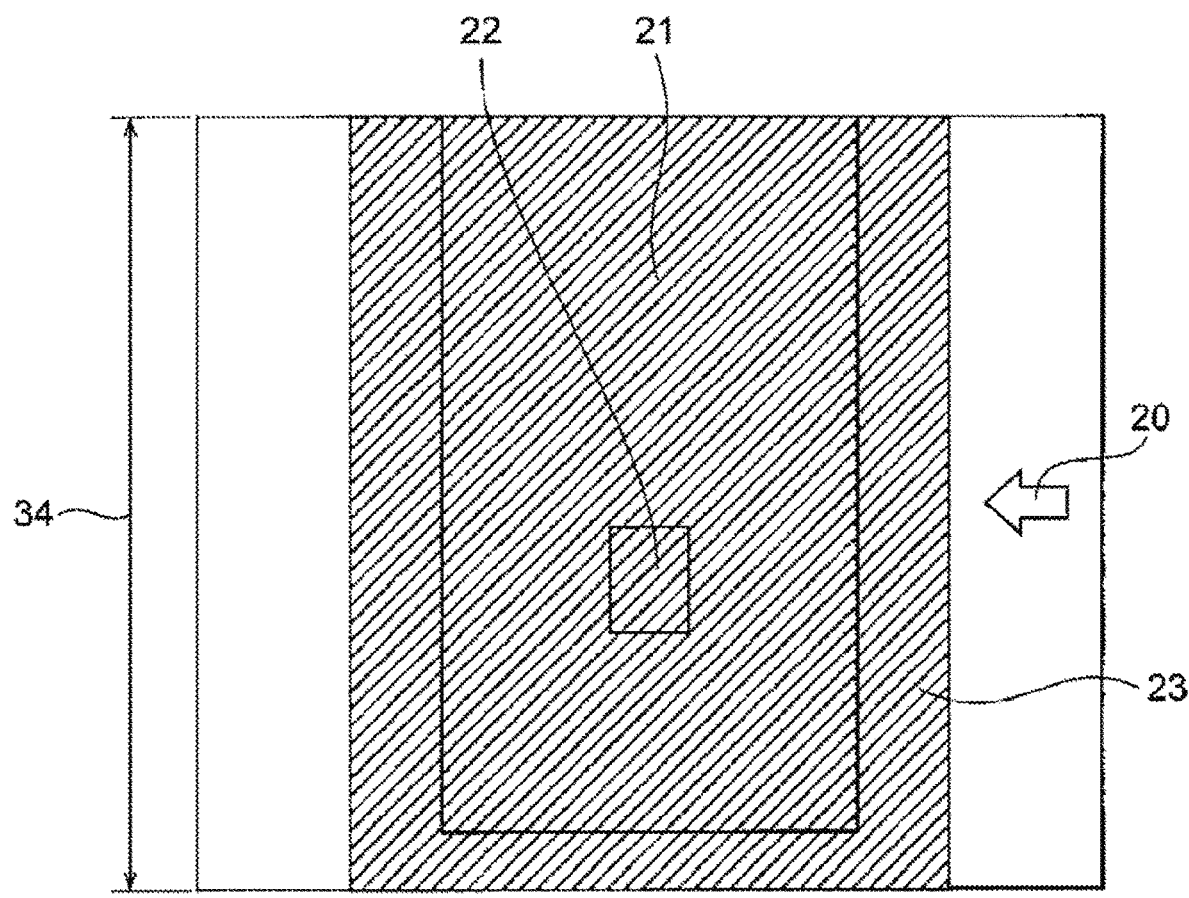
FIG. 11 is a view of the structure of the related art as viewed from a direction D of FIG. 8.

FIG. 8 is a cross-sectional view taken along a line C-C' of FIG. 4 illustrating a structure of the related art, and FIG. 11 is a view of the structure of the related art as viewed from a direction D of FIG. 8. The C-C' cross section illustrated in FIG. 8 is a cross section of a narrowest portion where a sectional area of the bypass passage 19 is the narrowest, and is the cross section cut at a position of the flow detection unit 22. During the normal operation, the air flow 25 on the flow detection unit 22 side and the air flow 26 on the package back side flow from the front of the paper surface of FIG. 8 toward the back as illustrated in FIG. 8. When the flow inside the intake body 17 pulsates and a state where there is no wind from a forward direction (a direction from the air cleaner 4 to the throttle valve 9) is formed, the air flows 25 and 26 split by the package 21 also tend to become the windless state in the same manner.

However, since there is the speed difference between the air flow 25 on the flow detection unit 22 side and the air flow 26 on the package back side, the air flow 25 on the flow detection unit 22 side having the relatively low speed reaches the windless state before the air flow 26 on the package back side. Thus, circulation 33 of the air flow flowing around from the package back side to the flow detection unit 22 side occurs as illustrated in FIG. 7, and this flow is detected by the flow detection unit 22 so that the thermal flowmeter 1 outputs the backflow although the backflow does not occur inside the intake body 17.

This is because the pressure difference occurs due to the difference in the flow rate occurring between the air flow 25 on the flow detection unit 22 side and the air flow 26 on the package back side, and the air flows around from the package front side to the package back side by being pulled by the pressure difference when an inertia force of the air flow 25 on the flow detection unit 22 side becomes smaller than a force generated by the pressure difference so that the circulation 33 of air flow around the chip package 21 occurs to cause the backflow.

Figure 9:
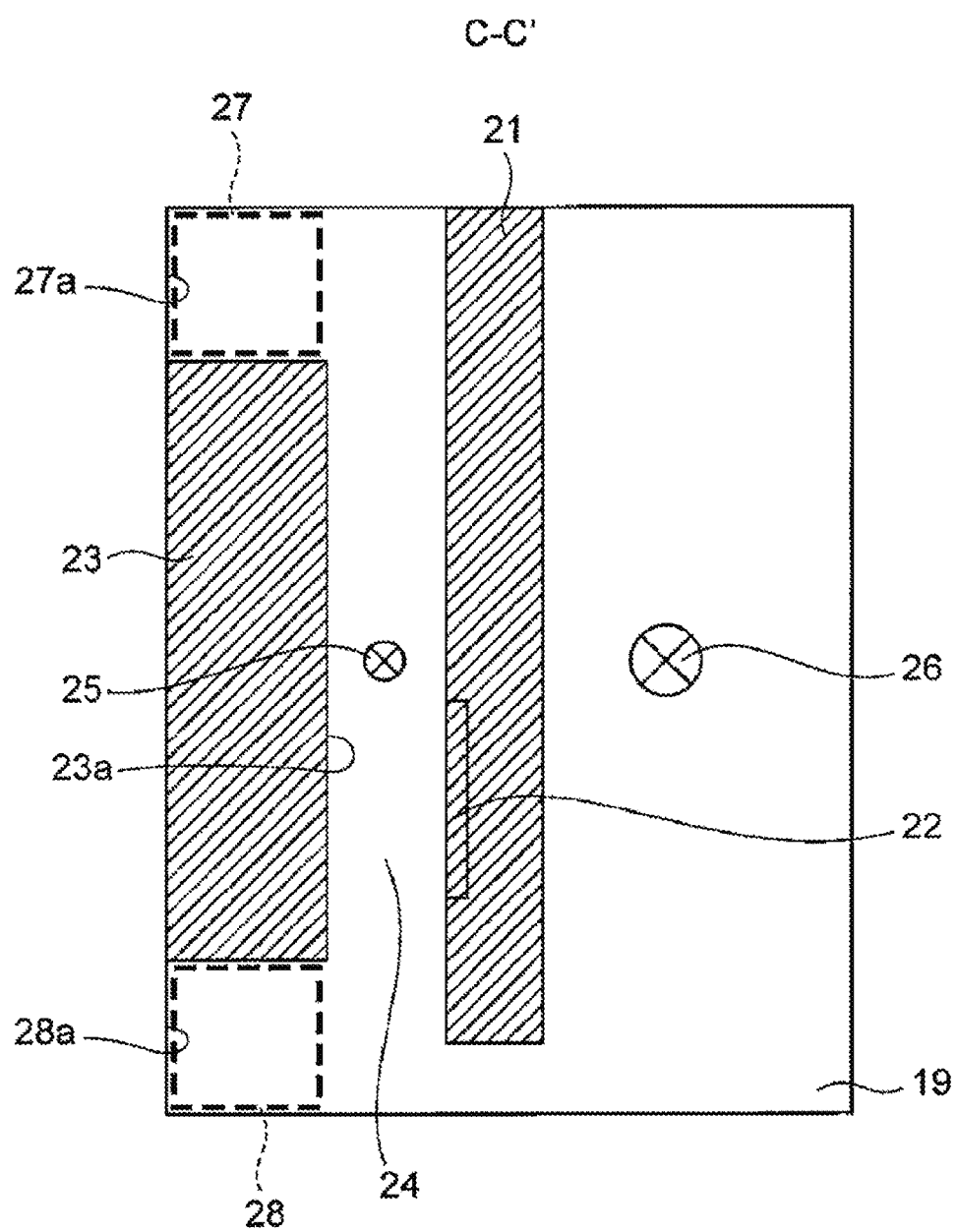
FIG. 9 is a cross-sectional view taken along the line C-C' of FIG. 4 illustrating a structure of a first embodiment.
Figure 10:
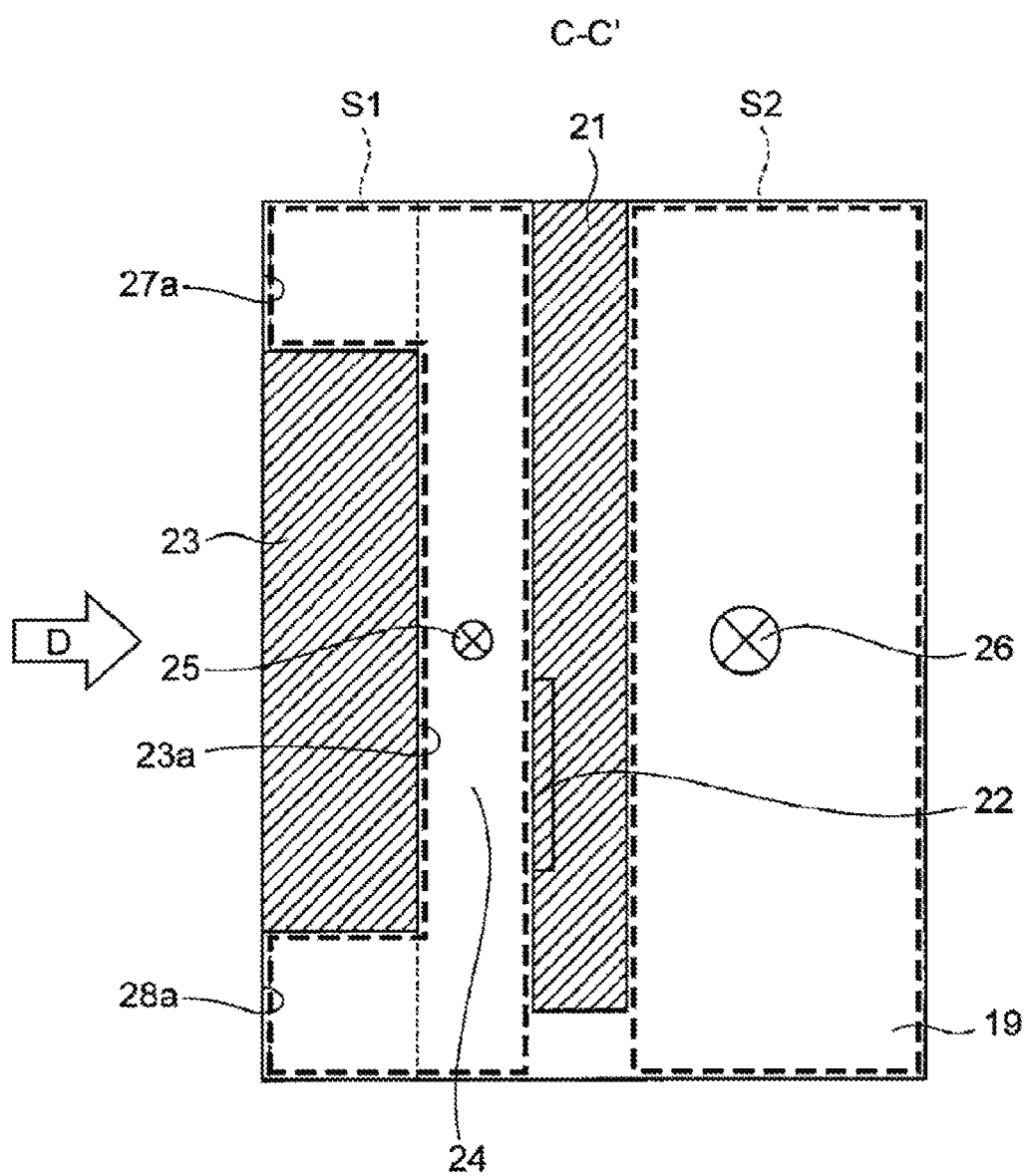
FIG. 10 is a cross-sectional view taken along the line C-C' of FIG. 4 illustrating the structure of the first embodiment.
Figure 12:
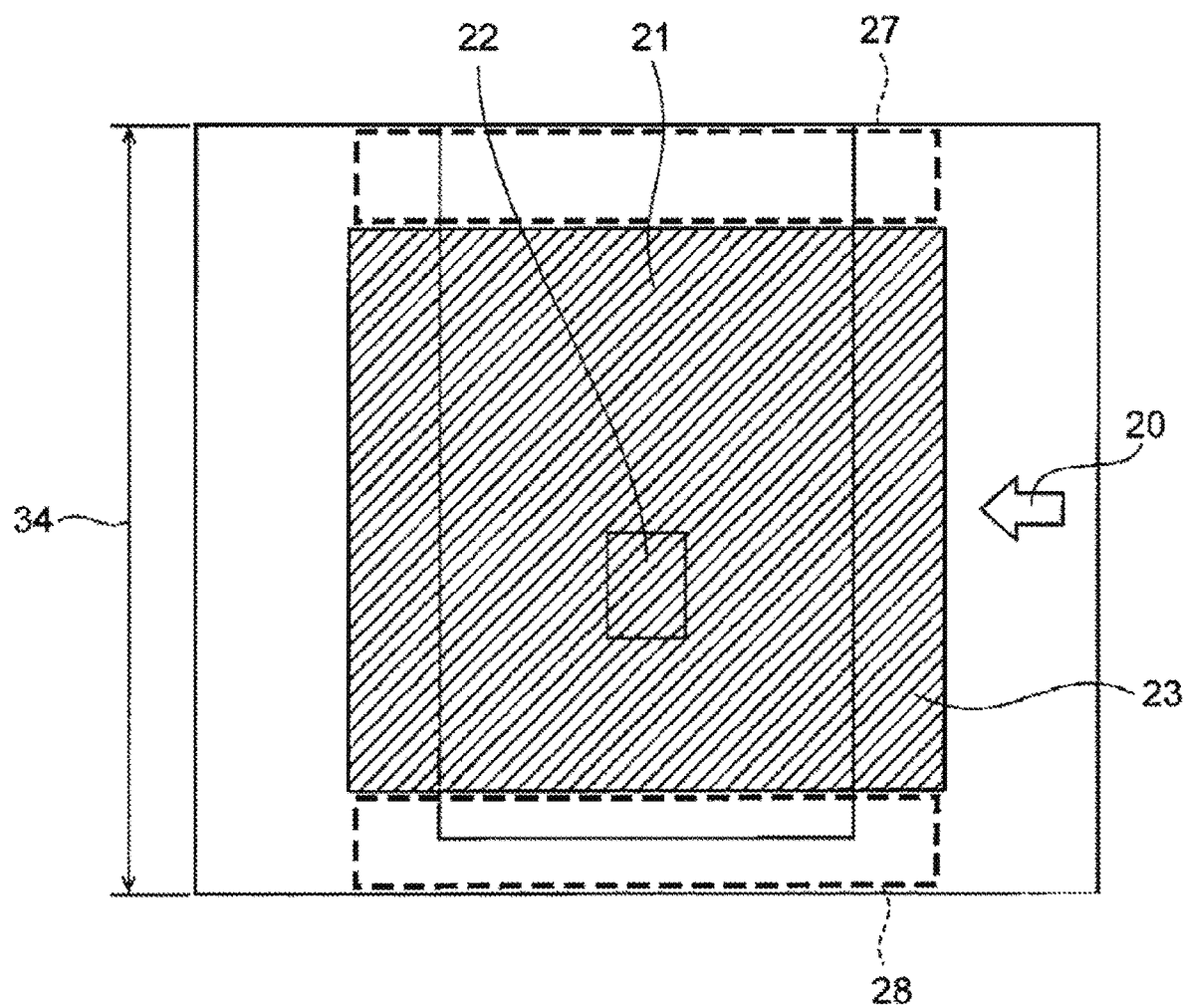
FIG. 12 is a view of the structure of the first embodiment as viewed from a direction D of FIG. 10.

FIGS. 9 and 10 are cross-sectional views taken along the line C-C' illustrating a structure of the first embodiment, and FIG. 12 is a view of the structure of the first embodiment as viewed from a direction D of FIG. 10. The cross sections illustrated in FIGS. 9 and 10 are cross sections of a narrowest portion where a sectional area of the bypass passage 19 of the present embodiment is the narrowest, and is the cross sections cut at a position of the flow detection unit 22.

In the first passage portion on the package front side, the bypass passage 19 has: a package front surface (detection surface) of the chip package 21 where the flow detection unit 22 is exposed; an opposing surface 23a that opposes the flow detection unit 22 on the package front surface; and non-opposing surfaces 27a and 28a which are disposed at positions deviating from the opposing surface 23a in a direction of a bypass passage width 34 to oppose the package front surface but not to oppose the flow detection unit 22. The non-opposing surfaces 27a and 28a are separated from the package front surface of the chip package 21 farther than the opposing surface 23a. The opposing surface 23a and each of the non-opposing surfaces 27a and 28a have configurations to be disposed in parallel with each other with a step therebetween.

In the first passage portion on the package front side, the bypass passage 19 has the protrusion 23 protruding toward the flow detection unit 22 and having a narrower width than the bypass passage width 34. The opposing surface 23a is formed at a distal end of the protrusion 23, and the non-opposing surfaces 27a and 28a are formed at positions deviating in the direction of the bypass passage width 34 with respect to the protrusion 23. Therefore, spaces 27 and 28 through which air flows are provided on both sides of the protrusion 23 in the direction of the bypass passage width 34 in addition to the throttle 24.

According to the present embodiment, whether the circulation 33 of the air flow occurs around the chip package 21 during the low idle operation is determined depending on a sectional area ratio (S1/(S1+S2)) which is a ratio between a sectional area S1 of the first passage portion through which the air on the flow detection unit 22 side flows when viewed from the C-C' cross section and a sectional area S2 of the second passage portion through which the air on the package back side flows.

In the conventional structure, the protrusion 23 has a width equivalent to that of the bypass passage width 34 as illustrated in FIGS. 8 and 11. That is, the protrusion 23 is provided over the entire width of the bypass passage width 34 of the first passage portion of the bypass passage 19 in the related art. Therefore, there is a risk that a difference between the sectional area of the package front side and the sectional area of the package back side is large, a pressure difference between the air flowing on the package front side and the air flowing on the package back side is large, so that the circulation 33 of air around the chip package 21 occurs.

On the other hand, the protrusion 23 narrower than the bypass passage width 34 of the first passage portion of the bypass passage 19 is provided in the present embodiment as illustrated in FIGS. 9, 10, and 12. The first passage portion is provided with the spaces 27 and 28 through which air flows on both the sides of the protrusion 23 in the direction of the bypass passage width 34 and the sectional area of the first passage portion is widened as compared with that of the related art. Therefore, it is possible to decrease a difference between the sectional area S1 on the package front side and the sectional area S2 on the package back side and to decrease a pressure difference between the air flowing on the package front side and the air flowing on the package back side. Therefore, it is possible to reduce the pressure difference by reducing a loss of the air flow to cause more air to flow to the flow detection unit 22 side, and it is possible to suppress the circulation 33 of the flow around the chip package 21.

FIGS. 13 to 16 are views illustrating other specific examples of the present embodiment. In this embodiment, it is not necessary to provide both the spaces 27 and 28, but at least one thereof may be provided. It is possible to secure a larger sectional area on the package front side in the case of providing both the spaces 27 and 28 as described above, which is also preferable in terms of the pressure difference. However, it is possible to decrease the pressure difference with respect to the package back side only by providing at least one of the spaces 27 and 28.

Figure 13:
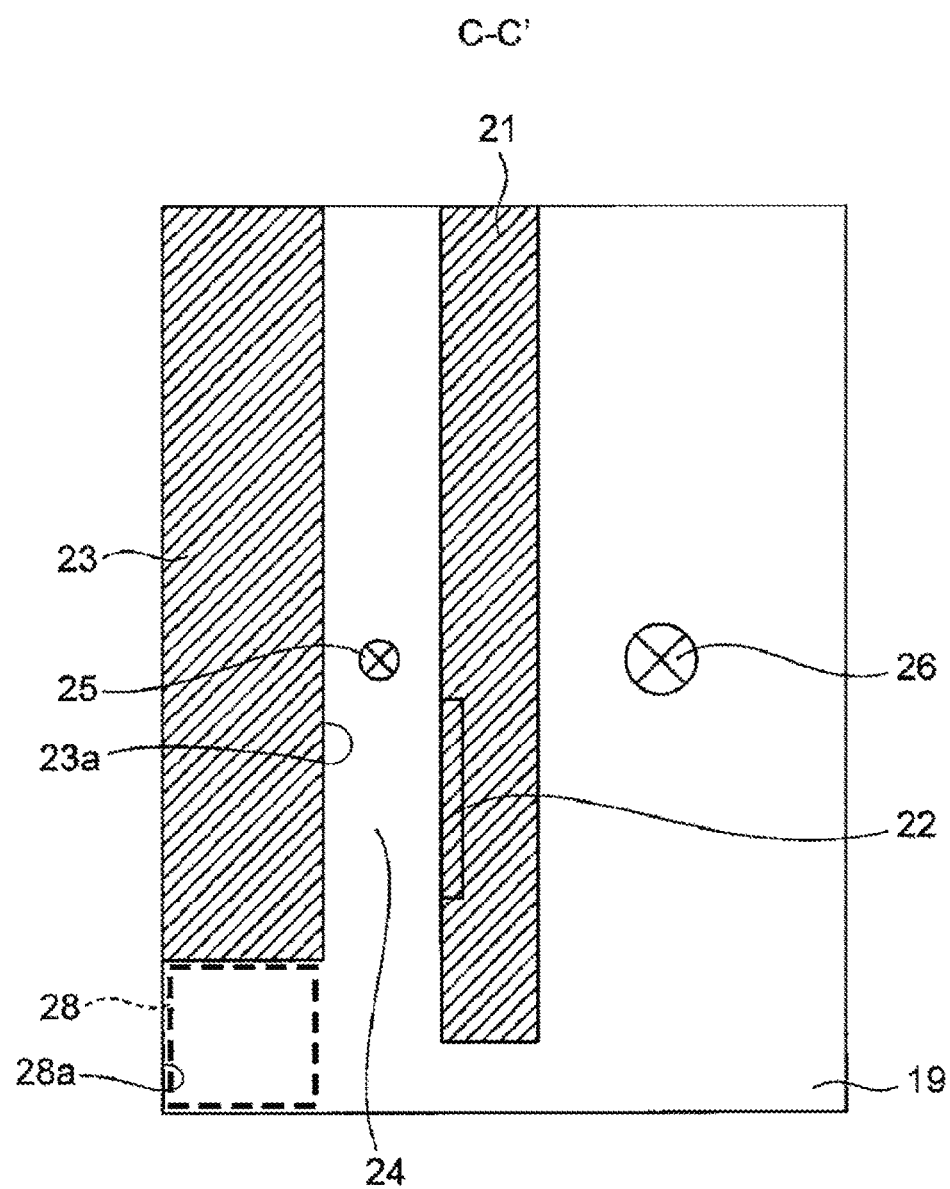
FIG. 13 is a cross-sectional view taken along the line C-C' of FIG. 4 illustrating another specific example of the first embodiment.
Figure 14:
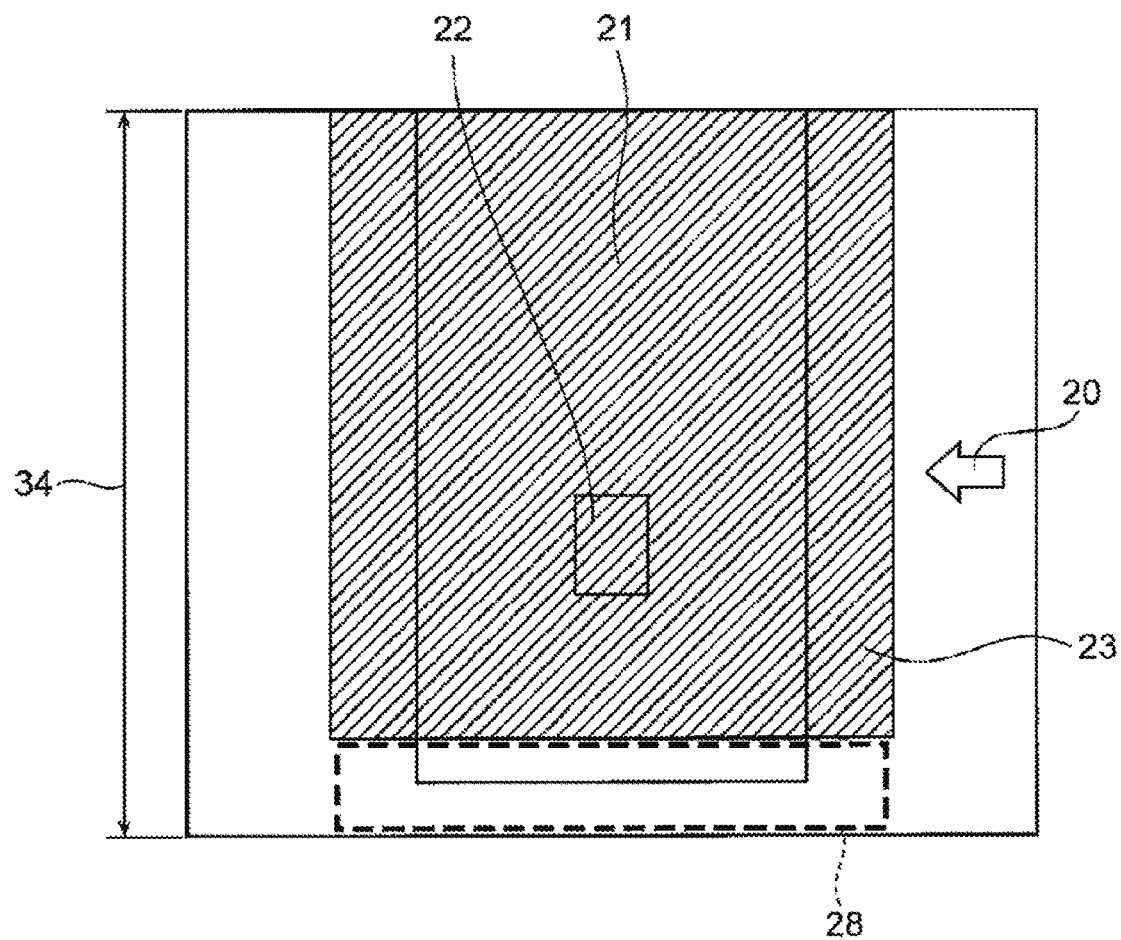
FIG. 14 is a view of the structure of another specific example of the first embodiment as viewed from the direction D of FIG. 10.

Only the space 28 is provided in the example illustrated in FIGS. 13 and 14. The space 28 is disposed on an inner peripheral surface side of the bypass passage 19 having a loop shape. When passing through the loop-shaped bypass passage 19, foreign substances such as water and contaminants contained in air move to an outer peripheral surface side by a centrifugal force and move along the outer peripheral surface. Since the inner peripheral surface side of the bypass passage 19 on the package front side is largely opened by the space 28, there is no risk of being blocked by the foreign substance, and it is possible to secure stable air flow.

Figure 15:
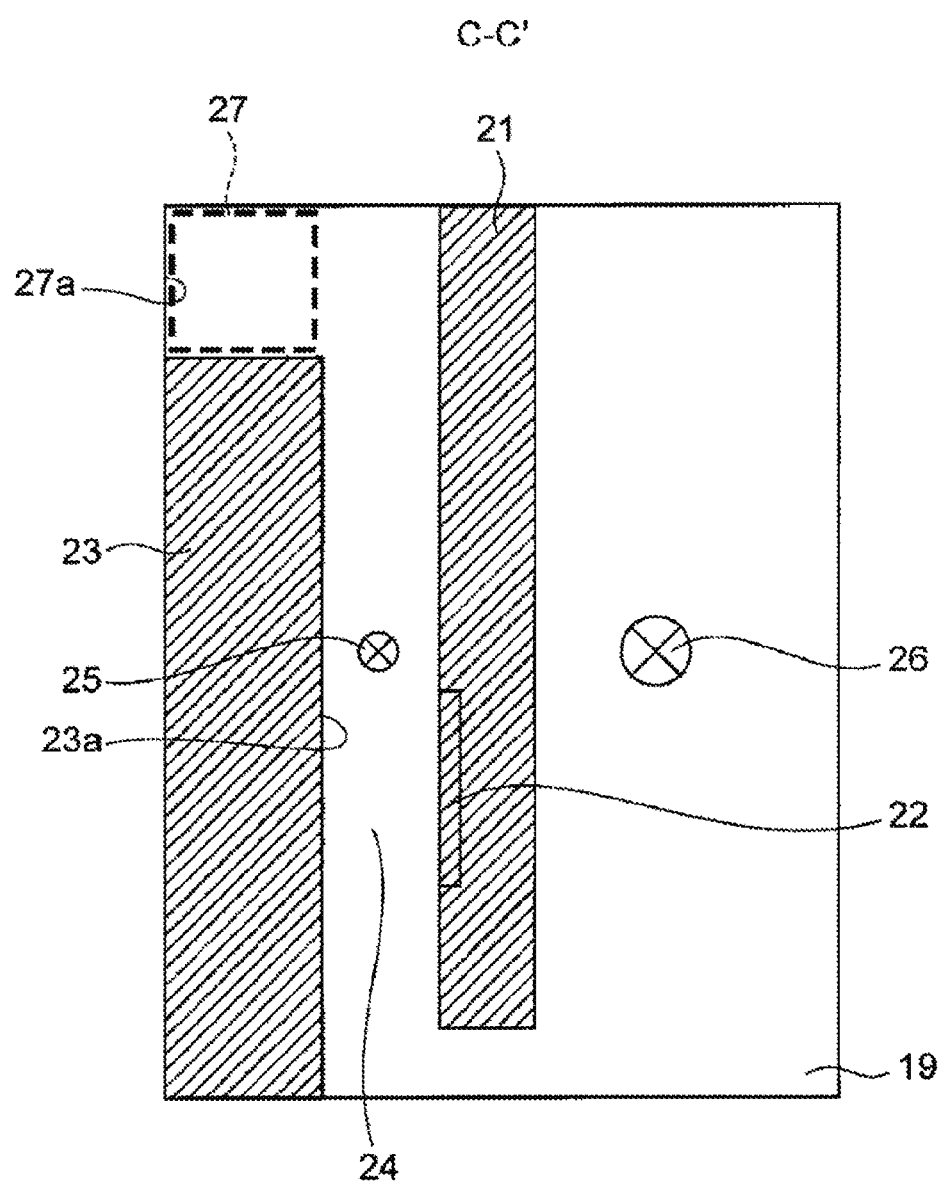
FIG. 15 is a cross sectional view taken along the line C-C' of FIG. 4 illustrating the structure of another specific example of the first embodiment.
Figure 16:
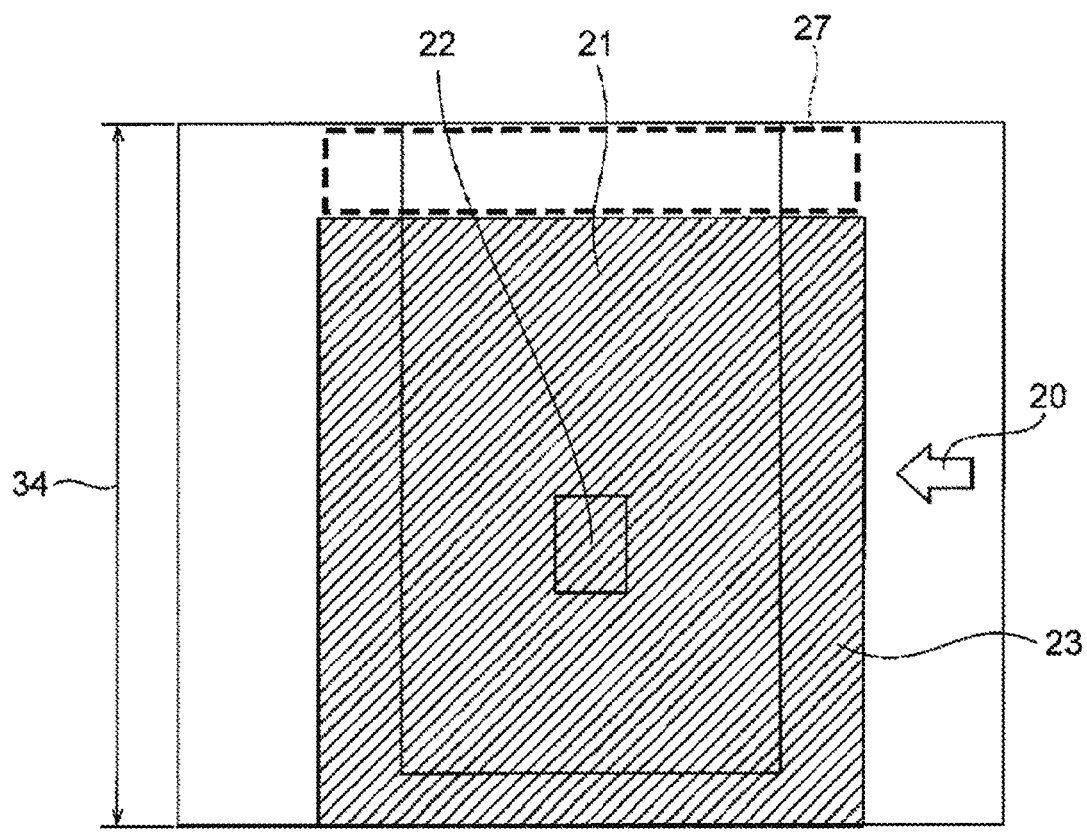
FIG. 16 is a view of the structure of another specific example of the first embodiment as viewed from the direction D of FIG. 10.

Only the space 27 is provided in the example illustrated in FIGS. 15 and 16. The space 27 is disposed on an outer peripheral surface side of the bypass passage 19 having a loop shape. As described above, foreign substances contained in air move to the outer peripheral surface side by a centrifugal force and move along the outer peripheral surface when passing through the loop-shaped bypass passage 19. Since the outer peripheral surface side of the bypass passage 19 on the package front side is largely opened by the space 27, it is easy for the foreign substances to pass therethrough and it is possible to secure stable air flow.

Figure 17:
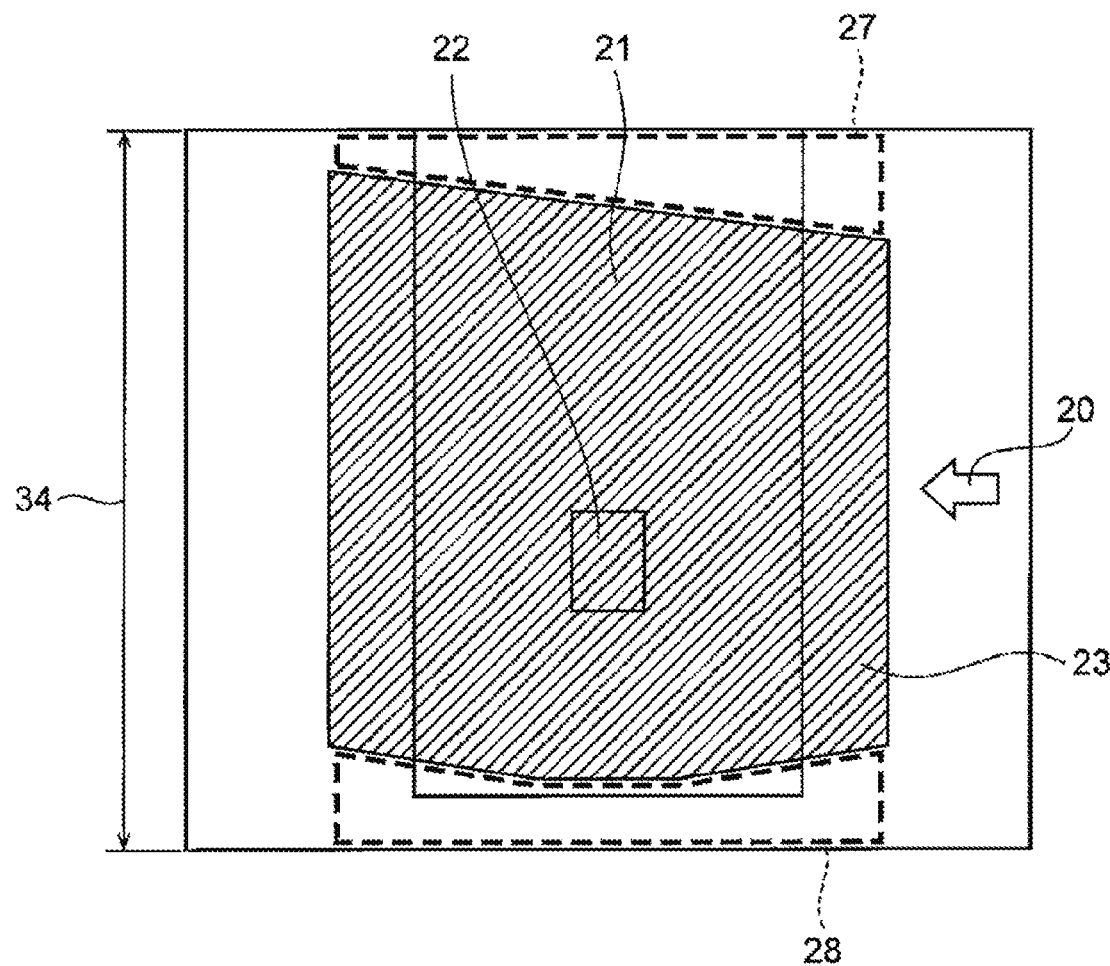
FIG. 17 is a view of the structure of another specific example of the first embodiment as viewed from the direction D of FIG. 10.

FIG. 17 is a view illustrating yet still another specific example of the embodiment. In this embodiment, it is unnecessary to provide the configuration in which the spaces 27 and 28 are provided in parallel to the air flow 20 in the bypass passage 19 as illustrated in FIG. 12, and it is not necessary to provide the configuration in which the spaces 27 and 28 have constant cross sections. For example, the space may have a complex shape such as a shape whose cross section is gradually narrowed toward an outlet side of the bypass passage 19 and a shape whose cross section is enlarged after being narrowed as illustrated in FIG. 17.

Figure 18:
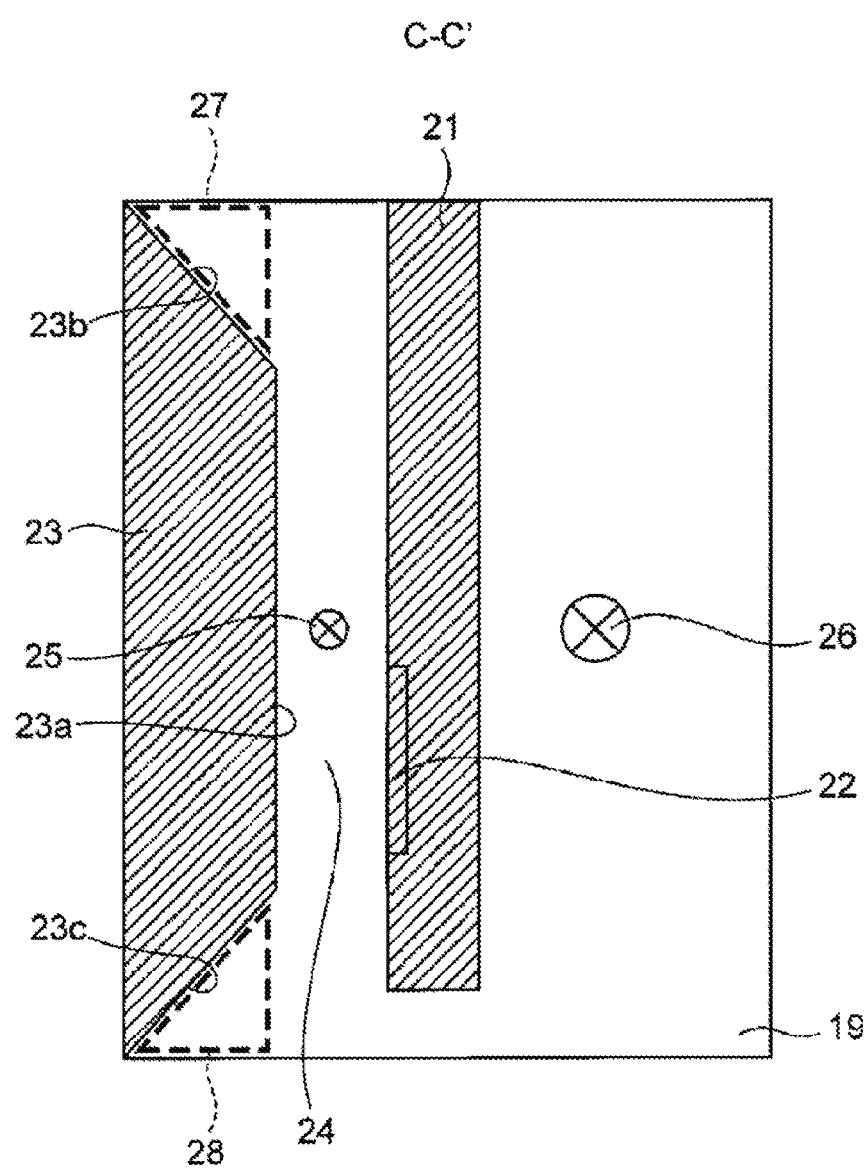
FIG. 18 is a cross sectional view taken along the line C-C' of FIG. 4 illustrating the structure of another specific example of the first embodiment.

FIG. 18 is a view illustrating still another specific example of the embodiment. In the above-described specific example, the opposing surface 23a and the non-opposing surfaces 27a and 28a of the protrusion 23 are disposed to be parallel to each other with the step therebetween. However, the present invention is not limited to such a configuration. For example, as illustrated in FIG. 18, inclined surfaces 23b and 23c may be provided at positions on both sides of the opposing surface 23a in the direction of the bypass passage width 34. The inclined surfaces 23b and 23c are gradually inclined in a direction of separating from the package front surface as moving from the opposing surface 23a to an outer side of the direction of the bypass passage width 34. Even with this configuration, it is possible to form the spaces 27 and 28 through which air flows even on both the sides of the protrusion 23 in the direction of the bypass passage width 34 in addition to the throttle 24, and it is possible to widen the sectional area of the bypass passage 19 on the package front side as compared with that of the related art to secure a larger sectional area.

Therefore, it is possible to decrease a difference between the sectional area S1 of the first passage portion on the package front side and the sectional area S2 of the second passage portion on the package back side and to decrease a pressure difference between the air flowing on the package front side and the air flowing on the package back side. Therefore, it is possible to reduce the pressure difference by reducing the loss of the air flow to cause more air to flow to the package front side, and it is possible to suppress the circulation 33 of the flow around the chip package 21. Incidentally, it is not necessary to provide both the spaces 27 and 28, but at least one thereof may be provided.

Figure 19:
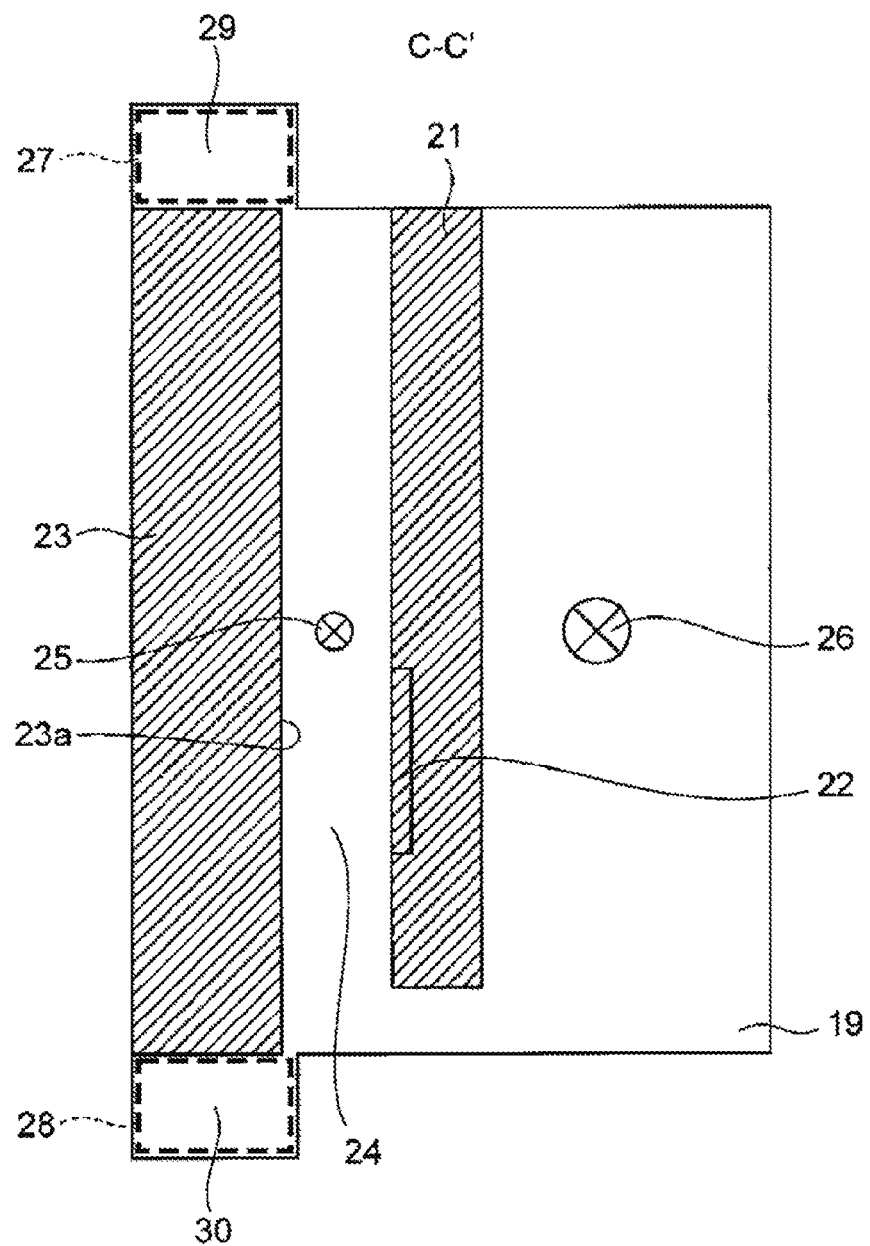
FIG. 19 is a cross sectional view taken along the line C-C' of FIG. 4 illustrating the structure of another specific example of the first embodiment.

FIG. 19 is a view illustrating still another specific example of the embodiment. Although the example in which both the opposing surface 23a and the non-opposing surfaces 27a and 28a are disposed at the positions opposing the chip package 21 has been described in each of the specific examples described above, the present invention is not limited to such a configuration, and may have any configuration as long as it is possible to widen the sectional area of the first passage portion on the package front side as compared to that of the related art.

Therefore, it is possible to obtain the same effects by providing passage portions 29 and 30 on both sides of the opposing surface 23a opposing the entire surface of the chip package 21 in the direction of the bypass passage width 34 and providing the spaces 27 and 28 while keeping a throttle width equal to the bypass passage width 34, for example, as illustrated in FIG. 19. In the structure illustrated in FIG. 10, it is possible to downsize the bypass passage 19. On the other hand, in the structure illustrated in FIG. 19, it is possible to suppress the circulation 33 of the flow in the same manner even when it is difficult to reduce a size of the protrusion 23 due to the relationship of a gate position, for example, in a case where the protrusion 23 is formed by injection molding of resin.

Figure 20:
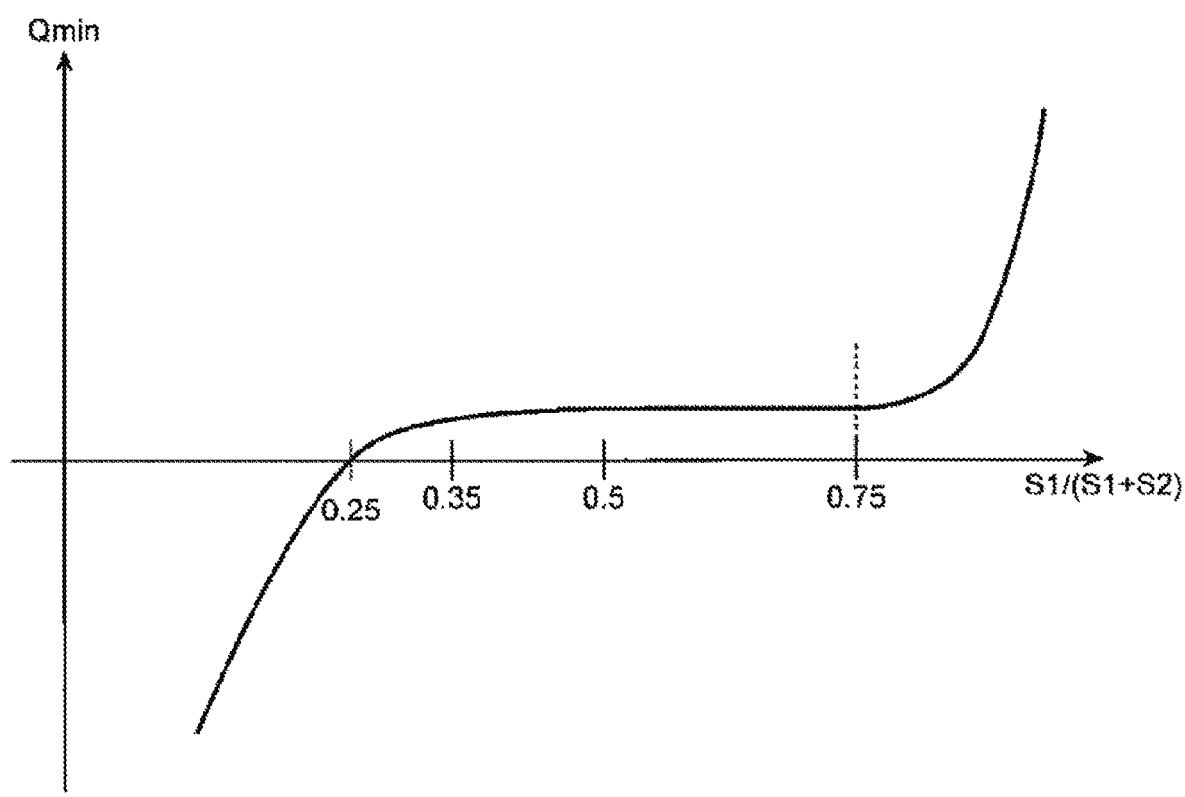
FIG. 20 is a relationship graph obtained by plotting a minimum flow rate value under pulsation in accordance with a ratio of a sectional area.

FIG. 20 is a relationship graph obtained by plotting a minimum flow rate value under pulsation in accordance with a condition of the ratio of the sectional area of the flow detection unit side and the sectional area of the package back side.

As illustrated in FIG. 20, when the sectional area S1 of the narrowest portion on the flow detection unit 22 side and the sectional area S2 of the narrowest portion on the package back side are assumed, a sectional area ratio is set such that $S1/(S1+S2)$ is 0.25 or more. Under this condition, the inertial force of the air flowing through the flow detection unit 22 side is larger than the force generated by the pressure difference, and thus, it is possible to suppress the circulation 33 of the air flow around the chip package 21 flowing from the package back side to the package front side, and Qmin can be set to zero or larger. Thus, it is possible to suppress the occurrence of backflow under the pulsation condition during the low idle operation, and thus, it is possible to further improve pulsation characteristics.

The sectional area ratio between the sectional area S1 on the package front side and the sectional area S2 on the package back side is set such that S1/(S1+S2) is 0.5 or less (0.25≤S1/(S1+S2)≤0.5) in the sense of preventing the circulation 33 of air in which air flows from the second passage portion on the package back side to the first passage portion on the package front side. More preferably, the sectional area ratio is set to be 0.35, which is a sectional area ratio that causes Qmin to converge at a constant value, or less as illustrated in FIG. 20 (0.25≤S1/(S1+S2)≤0.35).

In addition, the case in which the sectional area S1 of the narrowest portion on the package front side is smaller than the sectional area S2 of the narrowest portion on the package back side due to the protrusion 23 and the circulation 33 of air in which air flows from the package back side to the package front side during the low idle operation is prevented has been described in each of the specific examples described above. However, there is also a risk that circulation in which air flows from the first passage portion on the package front side to the second passage portion on the package back side occurs so that the flow detection unit 22 erroneously detects the air flow rate depending on the sectional area ratio of the narrowest portions on the package front side and on the package back side.

Therefore, a split ratio is set such that an area ratio S1/(S1+S2) between the sectional area S1 of the narrowest portion on the package front side and the sectional area S2 of the narrowest portion on the package back side is 0.75 or less. With such a configuration, it is possible to suppress the circulation in which air flows from the package front side to the package back side, to prevent the erroneous detection by the flow detection unit 22, and to measure the intake air flow rate with high accuracy under the low flow pulsation condition.

According to the thermal flowmeter of the embodiment described above, not only the foreign substances is prevented from reaching the package front side but also the boundary layer of the flow detection unit 22 is reduced by providing the protrusion 23 on the package front side so that it is possible to improve detection accuracy of the low flow rate and to suppress the circulation of the air flow around the flow detection unit 22 between the package front side and the bypass reverse side. Therefore, it is possible to prevent the erroneous detection of backflow by the flow detection unit 22 and to measure the intake air flow rate with high accuracy under the low flow pulsation condition.

Second Embodiment

Hereinafter, a second embodiment of the present invention will be described with reference to FIGS. 21 to 25. Incidentally, a description regarding the same configuration as that of the first embodiment will be omitted.

Figure 21:
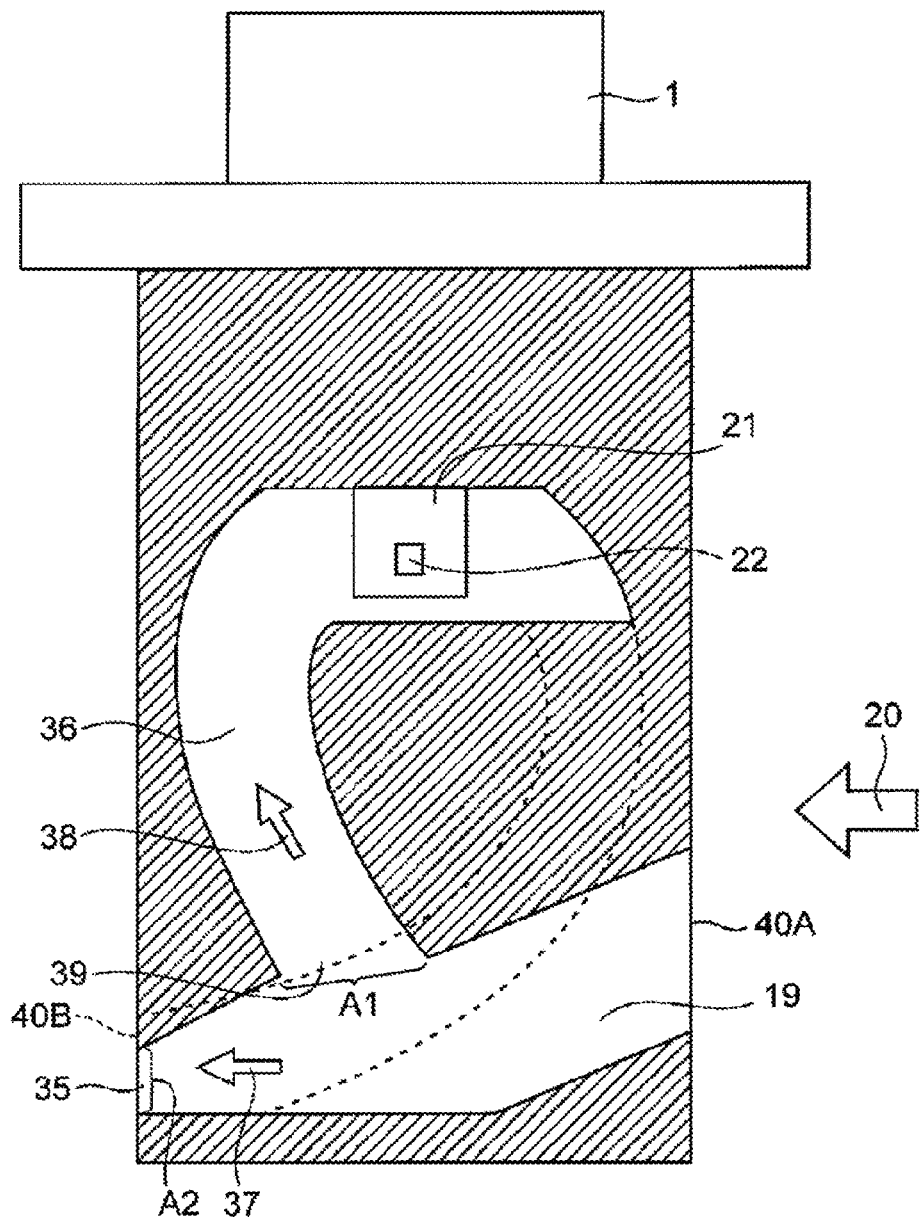
FIG. 21 is a view illustrating a structure of a second embodiment.

FIG. 21 is a view schematically illustrating a configuration of the thermal flowmeter 1 according to the second embodiment. A difference from the first embodiment is that the bypass passage 19 has a structure of branching into a first bypass passage and a second bypass passage 36 in the middle thereof. Regarding air taken into the bypass passage 19 from the bypass passage inlet 40A, a part of the air passes through the first bypass passage (the other branch path) and is discharged from a discharge port 35, and the remaining air flows into the second bypass passage (one branch path) 36, passes through a portion where the chip package 21 is provided, and is discharged from the bypass passage outlet 40B.

That is, in the thermal flowmeter 1 of the second embodiment, the structure of splitting air into the second bypass passage 36 and the discharge port 35 before the air reaches the chip package 21 supporting the flow detection unit 22 is considered. Such a branch structure of the bypass passage 19 has an effect of improving fouling resistance of the flow detection unit 22 since most of contaminants can be guided to the discharge port 35 by an inertial force.

Factors that cause the circulation 33 of flow around the chip package 21 under pulsation during the low idle operation are based on a force generated by a pressure difference, the inertial force of air flow on the flow detection unit 22 side, and a flow rate immediately before the chip package 21. In the structure in which the air inside the bypass passage 19 is split to the second bypass passage 36 and the discharge port 35, it is necessary to further consider the flow rate of air after being split by such splitting.

FIG. 21 is obtained by plotting a minimum flow rate value under pulsation when a condition of a sectional area ratio A1/(A1+A2)*S1/(S1+S2) is changed assuming that a sectional area of a branch portion 39 to the second bypass passage 36 in which air flows to second bypass passage flow 38 side is A1 and a sectional area of a portion in which air flows to the discharge port 35 is A2.

Figure 22:
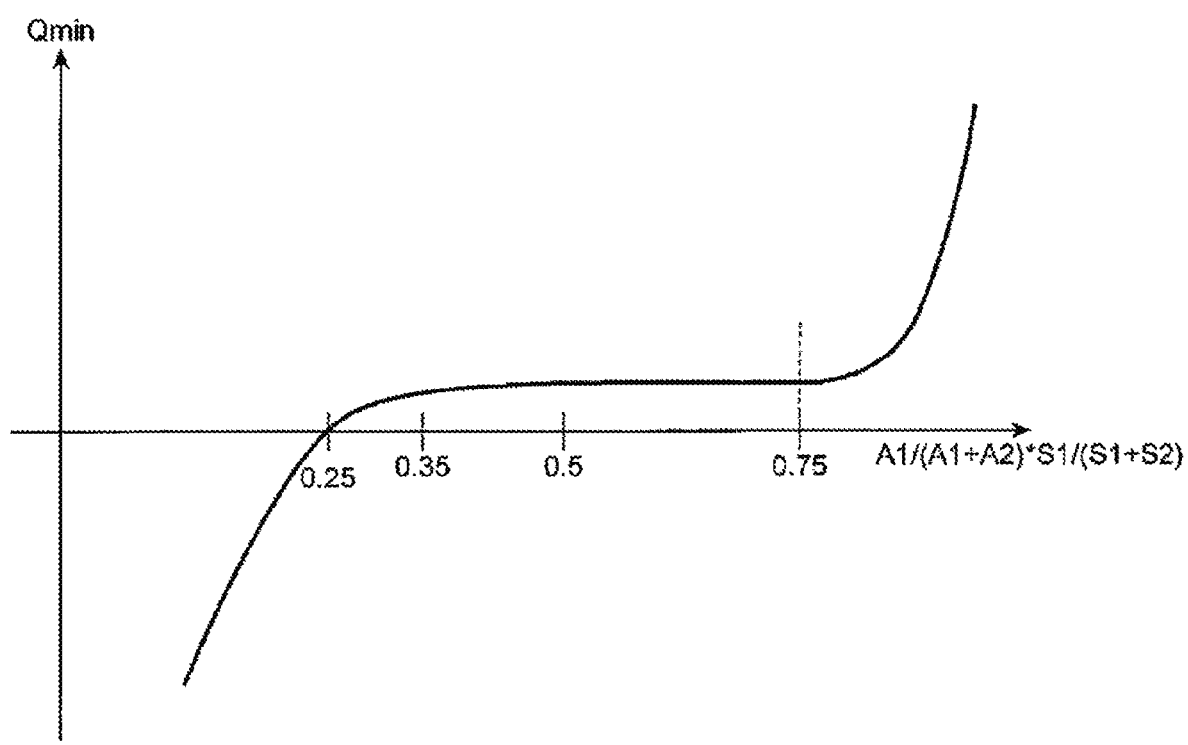
FIG. 22 is a relationship graph obtained by plotting a minimum flow rate value under pulsation in accordance with a ratio of a sectional area.

As can be understood from FIG. 22, Qmin can be set to zero or more by setting the split ratio such that the sectional area ratio A1/(A1+A2)*S1/(S1+S2) is 0.25 or more. This is because the inertial force on the flow detection unit 22 side is larger than the force generated by the pressure difference so that circulation 33 of air flow around the chip package 21 can be suppressed.

The sectional area ratio A1/(A1+A2)*S1/(S1+S2) is set to be 0.5 or less in the sense of preventing the circulation 33 of air in which air flows from the package back side to the package front side (0.25 A1/(A1+A2)*S1/(S1+S2)≤0.5). More preferably, the sectional area ratio is set to be 0.35, which is a sectional area ratio that causes Qmin to converge at a constant value, or less as illustrated in FIG. 21 (0.25≤A1/(A1+A2)*S1/(S1+S2)≤0.35).

In addition, the sectional area ratio A1/(A1+A2)*S1/(S1+S2) may be set to 0.75 or less. With such setting, it is possible to suppress the circulation in which air flows from the first passage portion on the package front side to the second passage portion on the package back side, to prevent the erroneous detection by the flow detection unit 22, and to measure the intake air flow rate with high accuracy under the low flow pulsation condition.

According to the present embodiment, it is possible to suppress the circulation 33 of air flow around the chip package 21 even in the structure in which the air taken into the bypass passage is split into the first bypass passage and the second bypass passage 36, and it is possible to further improve pulsation characteristics.

Figure 23:
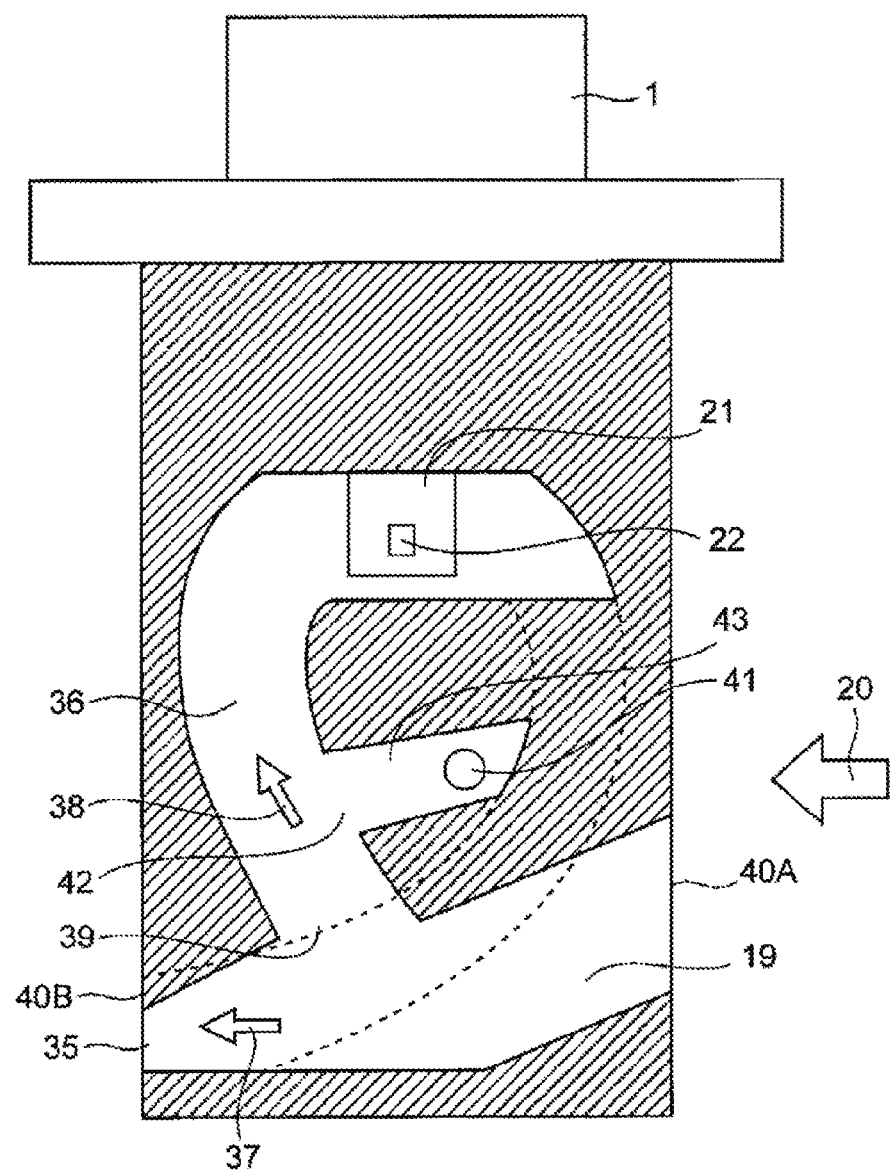
FIG. 23 is a view for describing another specific example of the second embodiment.
Figure 24:
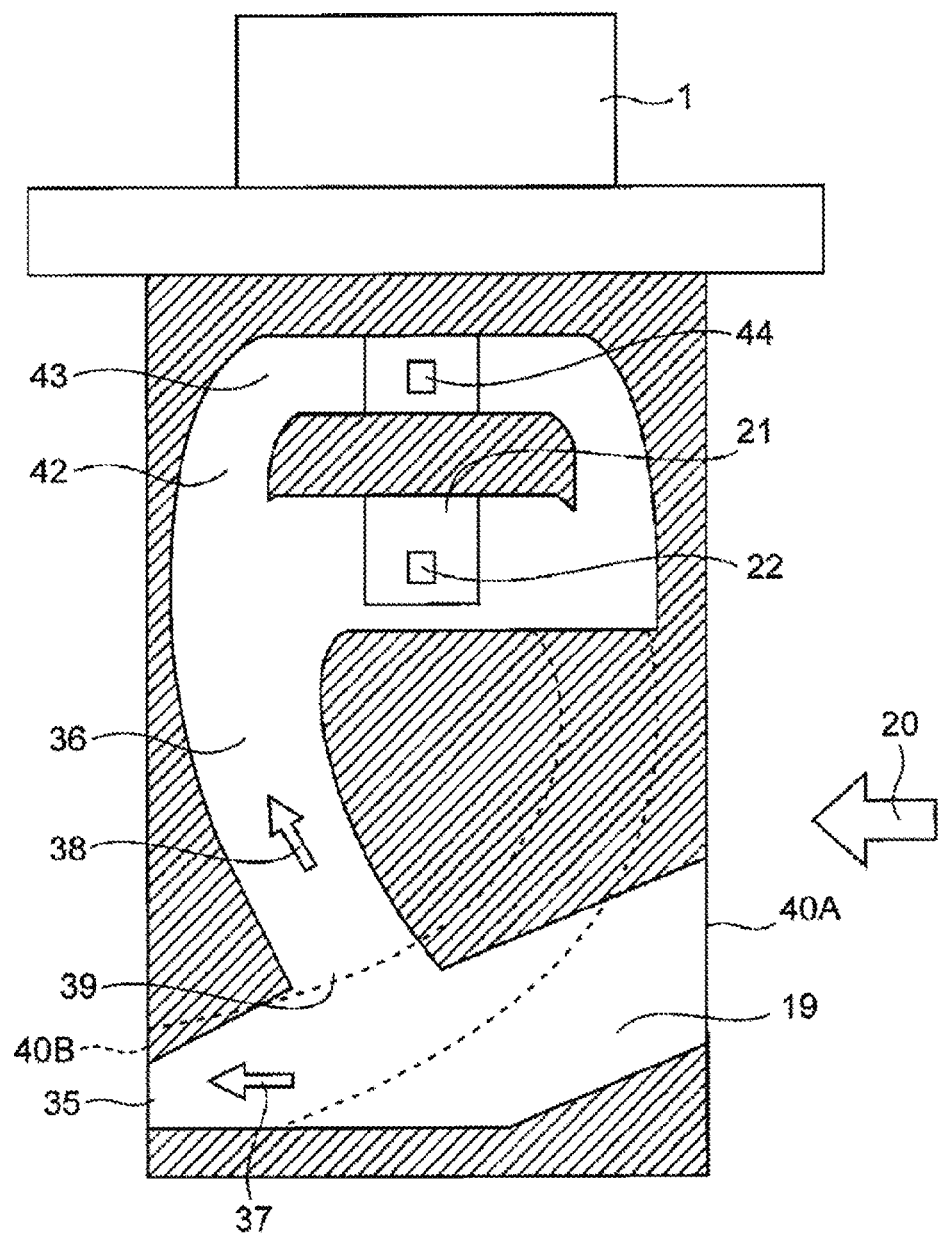
FIG. 24 is a view for describing another specific example of the second embodiment.
Figure 25:
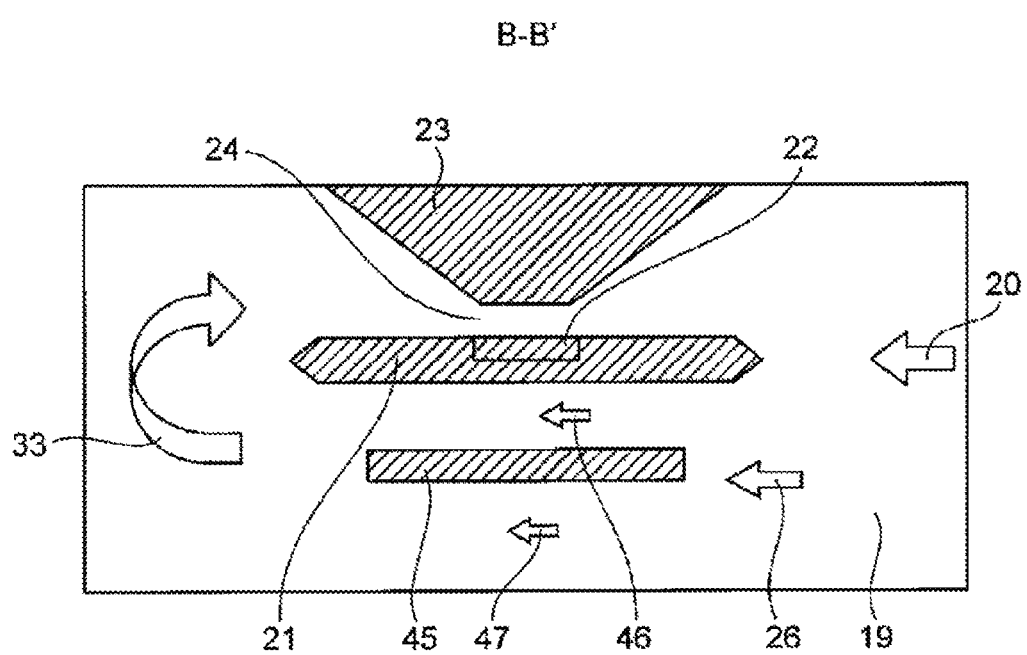
FIG. 25 is a cross-sectional view taken along the line B-B' of FIG. 4 for describing another specific example of the second embodiment.

FIGS. 23, 24, and 25 are views illustrating other specific examples of the present embodiment. Although the case where there are two branch points for bifurcating the intake air in the bypass passage 19 has been described in the above-described specific example, it is possible to similarly consider a case where there are three or more branch points for bifurcation. In this case, the same effects can be obtained by setting S11/(S11+S21)*S12/(S12+S22) * . . . * S1k/(S1k+S2k) to 0.25 or more. Here, k represents the number of branch points for bifurcation, S11 to S1k represent passage sectional areas on the flow detection unit 22 side at the respective branch points, and S21 to S2k represent sectional areas on the opposite side of the flow detection unit 22 side at the respective branch points.

As the case where there are three or more branches, there is a case where a water drain hole 41 is provided to prevent water entering the bypass passage 19 from reaching the flow detection unit 22 and a third bypass passage 43 connecting the second bypass passage 36 and the water drain hole 41 is provided, for example, as illustrated in FIG. 23.

In addition, there is a case where the third bypass passage 43 in which a humidity sensor 44 is provided is provided as illustrated in FIG. 24 in order to suppress the influence on the flow detection unit 22 when the thermal flowmeter 1 is provided integrally with the humidity sensor. In addition, there is a case where a fourth bypass passage is provided when a pressure sensor is additionally provided although not illustrated. Even in the case of providing three or more branches in the bypass passage 19 in this manner, it is possible to suppress the circulation 33 of air flow around the chip package 21 under pulsation during the low idle operation and to improve the pulsation characteristics.

In addition, as a structure branching into three, a partition plate 45 may be provided in the bypass passage 19, for example, as illustrated in FIG. 25. This case can be considered similarly as the previous embodiments. That is, when it is assumed that a sectional area of the narrowest portion (throttle 24) on the flow detection unit 22 side is S1, a sectional area of the narrowest portion on one side partitioned by the partition plate 45 on the package back side is S2, and a sectional area of the narrowest portion on the other side is S3, it is possible to obtain the same effects even if S1/(S1+S2+S3) satisfies a relationship of 0.25 or more.

Although the structure of the chip package in which a part of the flow detection element is sealed with resin has been exemplified as a support portion for supporting the flow detection unit 22 in the above-described respective embodiments, other structures, such as a ceramic substrate, a printed circuit board, and a resin molded body, that splits air while supporting the flow detection element may be used.

As above, the embodiments of the present invention have been described in detail, but the present invention is not limited to the above-described embodiments, and various design modifications can be made without departing from the spirit of the present invention recited in the claims. For example, the above-described embodiments have been described in detail in order to describe the present invention in an easily understandable manner, and are not necessarily limited to one including the entire configuration that has been described above. In addition, some configurations of a certain embodiment can be substituted by configurations of another embodiment, and further, a configuration of another embodiment can be added to a configuration of a certain embodiment. In addition, addition, deletion, or substitution of other configurations can be made with respect to some configurations of each embodiment.

REFERENCE SIGNS LIST 1 thermal flowmeter
2 PCV (positive crankcase ventilation)
3 intake manifold
4 air cleaner
5 crankcase
6 blow-by gas pipe
7 new intake air
8 blow-by gas
9 throttle valve
10 piston
11 exhaust manifold
12 injector
13 connecting rod
14 intake valve
15 exhaust valve
16 intake air temperature sensor
17 intake body
18 main passage
19 bypass passage
20 air flow
21 chip package (dividing portion)
22 flow detection unit
23 protrusion
24 throttle
25 air flow on package front side
26 air flow on package back side
27 space
28 interval
31 flow rate in body 17
32 detected flow rate of conventional thermal flowmeter
33 air circulation
34 bypass passage width
35 discharge port
36 second bypass passage
37 flow to discharge port
38 flow to second bypass passage
39 branch portion to second bypass passage
40 bypass passage inlet
41 water drain hole
42 branch portion to third bypass passage
43 third bypass passage
44 humidity sensor
45 partition plate
46 first flow on package back side
47 second flow on package back surface

The invention claimed is:

1. A thermal flowmeter comprising:
a bypass passage through which a gas to be measured passes;
a dividing portion which divides an inside of the bypass passage into a first passage portion and a second passage portion; and
a flow detection unit which is provided in the first passage portion and detects a flow rate of the gas to be measured, wherein
the first passage portion has a detection surface on which the flow detection unit is exposed, an opposing surface which opposes the flow detection unit on the detection surface, and a non-opposing surface which is disposed at a position deviating from the opposing surface in a bypass passage width direction of the first passage portion and does not oppose the flow detection unit, the non-opposing surface separated from the detection surface farther than the opposing surface, and
wherein the bypass passage has a relationship between a sectional area S1 of a narrowest portion of the first passage portion and a sectional area S2 of a narrowest portion of the second passage portion satisfying a condition of $0.25 \leq S1/(S1+S2) \leq 0.75$.

2. The thermal flowmeter according to claim 1, wherein
the first passage portion has a protrusion which protrudes toward the flow detection unit and is narrower than a bypass passage width of the first passage portion,
the opposing surface is formed at a distal end of the protrusion, and the non-opposing surface is formed at a position deviating in the bypass passage width direction with respect to the protrusion.

3. The thermal flowmeter according to claim 1, wherein the non-opposing surface is disposed at at least one of a position on one side and a position on another side in the bypass passage width direction of the first passage portion with respect to the opposing surface.

4. The thermal flowmeter according to claim 1, wherein the opposing surface and the non-opposing surface are disposed to be parallel to each other with a step therebetween.

5. The thermal flowmeter according to claim 1, wherein the non-opposing surface is inclined in a direction of separating from the detection surface as separating from the opposing surface in the bypass passage width direction of the first passage portion.

6. A thermal flowmeter comprising:
a bypass passage through which a gas to be measured passes;
a dividing portion which divides an inside of the bypass passage into a first passage portion and a second passage portion; and
a flow detection unit which is provided in the first passage portion and detects a flow rate of the gas to be measured,
wherein the bypass passage has a relationship between a sectional area S1 of a narrowest portion of the first passage portion and a sectional area S2 of a narrowest portion of the second passage portion satisfying a condition of $0.25 \leq S1/(S1+S2) \leq 0.75$.

7. The thermal flowmeter according to claim 6, wherein the relationship between the sectional area S1 of the narrowest portion of the first passage portion and the sectional area S2 of the narrowest portion of the second passage portion satisfies a condition of $0.25 \leq S1/(S1+S2) \leq 0.5$.

8. The thermal flowmeter according to claim 6, wherein the relationship between the sectional area S1 of the narrowest portion of the first passage portion and the sectional area S2 of the narrowest portion of the second passage portion satisfies a condition of $0.25 \leq S1/(S1+S2) \leq 0.35$.

9. A thermal flowmeter comprising:
a bypass passage through which a gas to be measured passes;
a dividing portion which divides an inside of the bypass passage into a first passage portion and a second passage portion; and
a flow detection unit which is provided in the first passage portion and detects a flow rate of the gas to be measured,
wherein the bypass passage has one branch path branching on a bypass passage inlet side of the flow detection unit and communicating with the flow detection unit with an opening area A1 and another branch path communicating with a discharge port with an opening area A2, and has a relationship between a sectional area S1 of a narrowest portion of the first passage portion and a sectional area S2 of a narrowest portion of the second passage portion satisfying a condition of $0.25 \leq S1/(S1+S2)*A1/(A1+A2) \leq 0.75$.

10. The thermal flowmeter according to claim 9, wherein the relationship between the sectional area S1 of the narrowest portion of the first passage portion and the sectional area S2 of the narrowest portion of the second passage portion satisfies a condition of $0.25 \leq S1/(S1+S2)*A1/(A1+A2) \leq 0.5$.

11. The thermal flowmeter according to claim 9, wherein the relationship between the sectional area S1 of the narrowest portion of the first passage portion and the sectional area S2 of the narrowest portion of the second passage portion satisfies a condition of $0.25 \leq S1/(S1+S2)*A1/(A1+A2) \leq 0.35$.

* * * * *